(12) United States Patent
Haven et al.

(10) Patent No.: US 11,461,926 B2
(45) Date of Patent: Oct. 4, 2022

(54) MACHINE VISION-BASED METHOD AND SYSTEM FOR MEASURING 3D POSE OF A PART OR SUBASSEMBLY OF PARTS

(71) Applicant: Liberty Reach Inc., Clearwater, ID (US)

(72) Inventors: G. Neil Haven, Clearwater, ID (US); Gary William Bartos, Somerville, MA (US); Michael Kallay, Bellevue, WA (US); Fansheng Meng, Ann Arbor, MI (US)

(73) Assignee: Liberty Reach Inc., Clearwater, ID (US)

( * ) Notice: Subject to any disclaimer, the term of this patent is extended or adjusted under 35 U.S.C. 154(b) by 106 days.

(21) Appl. No.: 17/020,910

(22) Filed: Sep. 15, 2020

(65) Prior Publication Data

US 2020/0410712 A1    Dec. 31, 2020

Related U.S. Application Data

(62) Division of application No. 16/174,554, filed on Oct. 30, 2018, now Pat. No. 10,776,949.

(51) Int. Cl.
*G06T 7/73* (2017.01)
*G06T 7/00* (2017.01)
*B25J 9/16* (2006.01)

(52) U.S. Cl.
CPC .............. *G06T 7/74* (2017.01); *B25J 9/1664* (2013.01); *B25J 9/1697* (2013.01); *G06T 7/0008* (2013.01); *G06T 2207/10028* (2013.01)

(58) Field of Classification Search
CPC .............. G06T 2207/10028; G06T 7/74; B25J 9/1697; B25J 9/1664

(Continued)

(56) References Cited

U.S. PATENT DOCUMENTS

| 3,180,205 A | 4/1965 | Heppe et al. |
| 4,195,221 A | 3/1980 | Moran |

(Continued)

FOREIGN PATENT DOCUMENTS

| EP | 3409848 A1 * | 12/2018 | ............... E02F 3/36 |
| KR | 100639139 B1 | 10/2006 | |

(Continued)

OTHER PUBLICATIONS

The International Bureau of WIPO, International Preliminary Report on Patentability for International Application No. PCT/US2019/058440 dated Apr. 27, 2021.

(Continued)

*Primary Examiner* — Wednel Cadeau
(74) *Attorney, Agent, or Firm* — Brooks Kushman P.C.

(57) ABSTRACT

A machine vision-based method and system for measuring 3D pose of a part or subassembly of parts having an unknown pose are disclosed. A number of different applications of the method and system are disclosed including applications which utilize a reprogrammable industrial automation machine such as a robot. The method includes providing a reference cloud of 3D voxels which represent a reference surface of a reference part or subassembly having a known reference pose. Using at least one 2D/3D hybrid sensor, a sample cloud of 3D voxels which represent a corresponding surface of a sample part or subassembly of the same type as the reference part or subassembly is acquired. The sample part or subassembly has an actual pose different from the reference pose. The voxels of the sample and reference clouds are processed utilizing a matching algorithm to determine the pose of the sample part or subassembly.

34 Claims, 11 Drawing Sheets

(58) Field of Classification Search
USPC .......................................................... 382/103
See application file for complete search history.

(56) References Cited

U.S. PATENT DOCUMENTS

| | | | |
|---|---|---|---|
| 4,373,804 | A | 2/1983 | Pryor et al. |
| 5,081,530 | A | 1/1992 | Medina |
| 6,751,344 | B1 | 6/2004 | Grumbine |
| 9,138,895 | B2 | 9/2015 | Melikian |
| 9,868,212 | B1 * | 1/2018 | Hinterstoisser ........ B25J 9/1671 |
| 9,990,685 | B2 | 6/2018 | Melikian et al. |
| 10,049,443 | B2 | 8/2018 | Bartos et al. |
| 10,676,900 | B2 | 6/2020 | Hiekata |
| 2005/0068317 | A1 * | 3/2005 | Amakai ................. G06T 7/0012 |
| | | | 345/419 |
| 2006/0149421 | A1 | 7/2006 | Akiyama et al. |
| 2010/0262278 | A1 * | 10/2010 | Winkler ............... B65G 1/1378 |
| | | | 700/214 |
| 2013/0329012 | A1 * | 12/2013 | Bartos ...................... G06T 7/80 |
| | | | 348/46 |
| 2016/0023352 | A1 | 1/2016 | Kennedy et al. |
| 2016/0239013 | A1 | 8/2016 | Troy et al. |
| 2018/0031364 | A1 | 2/2018 | Kallay et al. |
| 2018/0120218 | A1 | 5/2018 | Shultis et al. |
| 2018/0211399 | A1 * | 7/2018 | Lee ......................... G06T 7/536 |
| 2018/0235437 | A1 | 8/2018 | Ozerov et al. |
| 2019/0093321 | A1 | 3/2019 | Hiekata |

FOREIGN PATENT DOCUMENTS

| | | | | |
|---|---|---|---|---|
| KR | | 1181024 B1 * | 9/2012 | ........... B65G 59/107 |
| KR | | 101181024 B1 | 9/2012 | |
| WO | | 2017150134 A1 | 9/2017 | |

OTHER PUBLICATIONS

European Patent Office, Extended European Search Report for European Patent Application No. 19877660.1 dated Jul. 1, 2022.

* cited by examiner

MACHINE VISION-BASED METHOD AND SYSTEM FOR MEASURING 3D POSE OF A PART OR SUBASSEMBLY OF PARTS

CROSS REFERENCE TO RELATED APPLICATION

This application is a division of U.S. patent application Ser. No. 16/174,554, filed Oct. 30, 2018. This Application is related to co-pending patent application Ser. No. 15/822,683 filed Nov. 27, 2017, the disclosure of which is hereby incorporated by reference in its entirety herein.

TECHNICAL FIELD

At least one embodiment of the present invention generally relates to machine vision-based methods and systems for measuring the 3D pose of parts or subassemblies of parts, particularly in an industrial setting.

OVERVIEW

The non-contact measurement of pose of parts or subassemblies of parts is useful in a number of industrial applications as follows.

Rack Pick Application

In manufacturing environments such as automotive assembly plants, parts may be placed in storage racks. The storage racks, typically made of steel, are rigid enough to be picked up, moved, and stacked by forklifts. Inside the rack, parts sit or hang from mechanical fixtures. The parts rest parallel to one another from front to back. The front side of the rack is open so that a material handling robot can pick the parts from the rack one at a time and place the parts elsewhere. After the first part is picked from the rack, the robot must reach deeper into the rack to pick the second part, then the third part, and so on until the robot reaches into the back of the rack to pick the hindmost part.

Because robots for industrial applications lack built-in visual feedback, if a part in the rack is not in the precise location and orientation for which the robot's motion path was trained, the robot may fail to pick up the part. The robot may even crash into the part, and robot collisions are expensive. Collisions are expensive in terms of robot repairs and production downtime Industrial arm robots used in manufacturing are trained to repeat patterns of movement. For example, when a vehicle moves into a robot cell, a programmable logic controller could trigger the robot to execute a program specific to that vehicle model. The robot program performs a series of arm and gripper motions to pick up a vehicle part from one location and move the part to another location: the robot moves into position to pick up a part from a storage rack; closes a gripper to grasp the part; moves with the part in the gripper into position at the vehicle; and finally open the gripper to release the part. Robot tasks include not only grasping and moving parts, but also welding, spraying, attaching subassemblies to larger assemblies, and numerous other tasks.

Without integrated sensors, robots will follow their programs without stopping to avoid collisions, and without modifying their trained paths to accommodate parts not in the nominal location and orientation for which the robot was trained.

Simple feedback problems can be addressed with simple sensors. Proximity switches mounted to the robot can detect objects the robot approaches too closely, and thus trigger the robot to stop. Weight sensors can determine whether a robot has successfully picked up a part of some known weight.

More complicated sensory feedback such as determining the precise location and orientation of a vehicle part in a storage rack requires machine vision.

In the storage racks used in automotive assembly plants, parts are typically not fixtured precisely. Parts may be secured by dunnage, which is cheap, easily replaced material such as cardboard or some other flexible scrap material. The dunnage used to secure parts in the rack can shift, slip loose, get crushed, or be replaced at any time by other scrap material. The dunnage may vary from one rack to the next and may even vary from use to use of the same rack. This inconsistency in dunnage typically causes small changes in the fixturing of parts. Transporting racks from place to place can cause parts to settle or slip from the dunnage, or even damage the dunnage itself and allow the parts to settle out of position.

For many material handling applications, parts are not held precisely in mechanical fixtures. A robot requires the location and orientation of a part to be determined precisely, but creating precise mechanical fixturing requires significant resources. Preferably, parts would be fixtured simply, if imprecisely, and the robot would integrate sensors to determine the location and orientation of each part.

A machine vision system may be used to supply information about the pose of each part in the rack and thus provide corrections to the robot's trained path. The pose of an object is the position and orientation of the object in 3D space. A suitably parameterized machine vision system may use 2D images or 3D depth information as the raw data from which to extract the positions in 3D space of key features of a part in the rack. Given the 3D positions of these features for the nominal pose, and the 3D positions of the features for a part to be picked, the machine vision system can estimate the pose of the part relative to some nominal pose using techniques familiar to experts in machine vision and 3D geometry. However, the conditions of racks present several problems to state-of-the-art machine vision systems.

The pose of an object is the position and orientation of the object in space relative to some reference position and orientation. The location of the object can be expressed in terms of X, Y, and Z. The orientation of an object can be expressed in terms of Euler angles describing its rotation about the x-axis (hereafter RX), rotation about the y-axis (hereafter RY), and then rotation about the z-axis (hereafter RZ) relative to a starting orientation. There are many equivalent mathematical coordinate systems for designating the pose of an object: position coordinates might be expressed in spherical coordinates rather than in Cartesian coordinates of three mutually perpendicular axes; rotational coordinates may be expressed in terms of quaternions rather than Euler angles; 4×4 homogeneous matrices may be used to combine position and rotation representations; etc. But generally, six variables X, Y, Z, RX, RY, and RZ suffice to describe the pose of a rigid object in 3D space.

The pose offset of a sample part is the measured pose relative to the reference pose. By expressing the pose offset as a 4×4 homogeneous matrix, and by multiplying each waypoint in the robot's motion path by the matrix, the transformed points defined an adjusted motion path that will move the robot so that it addresses the sample part in the same manner it was trained to address the reference part in the reference pose.

Even when each part in a rack is the same type, such as a driver's side fender for a passenger sedan, the appearance of the part may vary from one rack position to the next.

Lighting conditions can change significantly from the foremost to hindmost positions in the rack. The part in the foremost rack position, close to the opening, may be exposed fully to bright ambient factory lighting, whereas the part in the hindmost rack may lie in strong shadow cast by the rack itself. Rather than a fully closed box, the storage rack may have opening in the top and sides that cast patterns of shadows onto the parts inside. These changes in lighting conditions present problems to machine vision systems that rely on visible light to produce images.

The gripper used to pick parts from the rack is mounted as the robot end-of-arm tool. For a machine vision system, robustness and repeatability of measurement are best achieved by mounting sensors as close as feasible to the part to be inspected, and at a consistent distance from the part for each subsequent part measurement. In a rack, the next part to be picked is farther back in the rack. Since the robot reaches into the rack to pick parts, it is preferable to mount the vision sensor(s) to the robot end-of-arm tool. However, the gripper mechanism mounted as the robot end-of-arm tool may have little free space to mount additional components. Machine vision sensors that are too large, too heavy, or otherwise unsuitable for mounting to the robot end-of-arm tool may need to be mounted at a fixed position outside the rack. If a machine vision sensor is mounted outside the rack then it must image parts at different distances, making robustness and repeatability of measurement hard to achieve since 3D measurement error increases with distance.

Many machine vision systems rely partly or entirely on visible light to produce images. For rack pick applications in automotive assembly plants, the parts within the rack may be fenders or frame subassemblies or other body components measuring one meter or more in the longest dimension. Machine vision systems that image visible light are difficult to make robust for inspections of large objects illuminated by ambient light.

Traditional 2D vision systems use visible or near-infrared lights to illuminate a scene. Controlling lighting is easier for small targets than for large targets. Larger targets such as airplane fuselages, vehicle bodies, engines, and large vehicle subassemblies must typically be imaged on a factory floor. Factory lighting will already be present for the benefit of human workers. This high-intensity lighting is typically not optimal for a machine vision system. Controlling the lighting for a part measuring one meter or more can be difficult and/or expensive since the lighting provided to illuminate a target must typically be significantly brighter than the already bright factory lighting. Designing and mounting shrouds to block ambient light and purpose-selected lights to illuminate the part requires engineering time. For robot-mounted sensing, there may be little room to mount a light large enough to illuminate a large part.

Robustness of such systems may be achieved in some cases at great expense, or by spending considerable effort to design a work cell around the lighting requirements of a 2D vision system. It would be preferable to install a sensor that does not require additional illumination, and that can yield accurate 3D data whether ambient lighting is intense or not.

Machine vision systems used for rack pick applications may need to be trained to use different measurement criteria for each rack position. In addition to changes in lighting from the frontmost to hindmost rack position, the background appearance of the rack changes as each part is picked. The number of parts visible in the background changes as each part is picked. The next part to be picked is closer to the back wall of the rack. Having to tailor measurement criteria differently for each rack position is inefficient and complicates setup and support of the machine vision system.

Machine vision systems that rely on detection of features such as holes and edges require the installation engineer to make a series of choices about which features to select. Depending on feature shape, size, or consistency of appearance, the installation engineer may even need to choose different algorithms to find different features on the same part. Although this practice of setting application-specific parameters is typically assumed to be necessary for vision system setup, ad hoc parameterization of machine vision systems is inefficient.

Traditionally, parameterization of a vision system requires engineers or trained users to select features to be measured. For example, to train a traditional vision system to find a through-hole in a vehicle body and report the hole's location in 3D space, the user would select one of several algorithms capable of finding a hole, select an option to report the hole's center, and then select a geometric algorithm to transform the hole center coordinates into coordinates usable by a robot. A second hole with a different shape may require a different hole-finding algorithm. For each such feature, the user must make several choices which may require testing and correction.

Training and experience are required to learn to parameterize machine vision systems correctly. In this sense, a traditional machine vision system is like an industrial arm robot: it can only follow the programming dictated by the user. The user must account for all the conditions that could cause the trained program to fail.

A more efficient approach would be to employ a machine vision system that does not require ad hoc selection of features, but that instead can be trained with the click of a button. The user does not need to learn the particulars of image processing or learn how to select features.

Some systems may determine corrections for the robot path by analyzing edge information in an image captured by a 2D camera and then comparing the 2D edges to the relative positions and orientations of edges in a reference image. The pose of the sensor can then be inferred from the relative pose of the image of sample edges compared to the image of reference edges. One such system is the Cortex Recognition system from Recognition Robotics. U.S. Pat. Nos. 9,138,895 and 9,990,685 are relevant in this regard. Rack pick applications that require precise measurement of part pose may also be difficult for vision systems that estimate pose from the presence of edges because 3D pose inferred from the relative positions of edges can be inaccurate in measurement of orientation.

The 3D pose of an object can be inferred from the relative positions of edges in an image of the object. For example, the edges of a square viewed at an oblique angle will form a trapezoid or trapezium in a 2D image. The location and orientation of the square can be inferred by the relative positions and angles of the straight edges with respect to each other.

The 3D pose of a more complex shape such as a vehicle door can also be inferred from the relative positions of edges. A model of the door is captured by extracting edges from a reference image of the door.

Edge images may need to be manually edited by the user to remove undesired edges, but manual editing of reference data by users is inefficient and can be hard to reproduce. If a machine vision system captures a reference 2D image or reference 3D cloud that includes undesirable data, and if the undesirable data could impede the machine vision system's function, then the image or cloud can be presented to a user to edit. For example, the Cortex Recognition system from Recognition Robotics processes a reference image to generate image edge data, and the user can edit the reference image to remove edges for features the user deems unimportant or irrelevant, or remove edges that belong to the background rather than to the part.

Requiring a user to manually reference data adds ad hoc parameterization to engineering setup. A user would need to be trained to understand what edges to remove, and then during setup time would be required to remove the edges. Even if an expert user can perform the edge removal quickly, it would be preferable not to have to perform the manual process at all. It would be preferable for a machine vision system to remove undesired image or cloud data automatically, or to simply perform robustly in the presence of such undesirable data.

In addition, ad hoc setup decisions related to the parameterization of a machine vision system may vary from user to user. If the setup between users is not reproducible, then the performance of the system may not be reproducible as well. Ideally, performance of a machine visions system will not vary from user to user.

Manual editing of reference data is a form of ad hoc parameterization, and ad hoc parameterization of machine vision systems is inefficient as previously mentioned.

Any "feature-based" machine vision systems can suffer from inaccuracy of measurement. Features such as edges and holes may be used to determine the position of individual points in space, but point-based pose measurement accuracy is limited by the number and accuracy of points measured. As shown in FIGS. 12-15, a feature-based machine vision system may determine object pose by measuring the position of at least three optically distinct features in 3D space. Hole centers, object corners, the geometric centers of optically distinct shapes, and other features may yield 3D points in space.

For a machine vision system that determines object pose by the point locations of individual features, the accuracy of pose measurement is determined by the accuracy of individual point measurements. For example, if one feature on a part can be measured less accurately that others, then the accuracy of rotation measurement for the whole part may be determined largely by the inaccuracy of measurement of that one point.

As is well known to those trained in the art of geometry and 3D measurement, at least three points are required to uniquely and unambiguously determine the pose of an object in 3D space. Robustness of measurement may be improved by measuring four or more points and then applying a least squares fit or other common mathematical technique to find a best fit solution. However, for a feature-based machine vision system measuring more points requires making more choices about features and feature-finding algorithms, so improvements in robustness may be achieved in exchange for greater complexity of setup.

Machine vision systems and other systems that determine pose of an object from a relatively limited number of points in 3D space typically assume that the object is a rigid body with a pose limited to six degrees of freedom, specifically three degrees of freedom of translation and three degrees of freedom of rotation. However, if the part droops or flexes when fixtured, then another degree of freedom is introduced. Deformation may not be consistent from part to part, especially in storage racks or other fixtures in which the part is loosely and imprecisely fixtured. When a limited number of points are measured, it can be difficult to distinguish between inaccurate measurement of points and accurate measurements of points subject to non-rigid deformation: in either case, one or more points are shifted in relation to the other points. Those familiar with the art of mathematics may implement techniques to determine whether a non-rigid transform is required to match points from one part pose to another part pose, but calculating the non-rigid transform does not indicate whether the part is drooping, or whether one or two points have been measured inaccurately.

As shown in FIGS. 16-20, a feature-based machine vision system may determine object pose from optically distinct features will yield inaccurate measurements if the pose of a drooped part is found using a rigid transform from the points on the sample drooped part to the corresponding points on the nominally flat reference part.

A critical problem is that the pose of a featureless part cannot be measured by a feature-based or edge-based machine vision system. Such a system may not yield a measurement at all. It is preferable that pose can be determined accurately for a part whether than part has optically distinct features or whether the part is effectively featureless and smoothly contoured.

A smooth, gently contoured part may not have the optically distinct features that a feature-based machine vision system requires to determine the location and orientation of the part. For example, the aerodynamics and aesthetics of a stamped metal exterior vehicle panel for a sports car may require a smooth surface devoid of holes, sharp edges, or sudden changes in surface curvature.

A minimum of three points are required to determine unambiguously the pose of a rigid body in 3D space. If a feature-based system cannot determine the location of at least three distinct points accurately and repeatably, then the system cannot measure the pose of the part.

Cassette Pick Application

In manufacturing environments such as automotive assembly plants, parts may be placed in cassettes. A material handling robot picks a part from the cassette and places the part elsewhere.

A typical cassette holds multiple individually fixtured parts. After a material handling robot picks the foremost part from the cassette, the cassette moves the parts forward by gravity feed or motor movement so that the next part assumes the same pose in space as the previously picked part. The robot executes its trained motion path to pick the foremost part again. The process continues until all parts have been picked and the cassette is empty.

In contrast with a storage rack that uses mechanical fixtures and dunnage to loosely fixture parts, the mechanical fixturing in a cassette may present a part more precisely. During normal operation, a robot may be able to pick parts from the cassette simply by following a trained path, and no additional sensor feedback may be necessary to provide adjustment to the robot's trained motion path. The cassette may also present the foremost part such that it hangs in space, outside the rigid structure of the cassette, thus limiting the possibility of a collision between robot and cassette as the robot picks a part.

Manufacturing apparatus and processes are subject to different failure modes. In a storage rack, parts may be less precisely positioned, but if a part slips from its rack position the magnitude of shift of the part's pose may be constrained by the rack holders or by the walls of the rack. By contrast, if a part slips from its mechanical fixturing in the cassette, the part pose may shift significantly since the part's pose may not be constrained by the walls of the cassette. For example, if a cassette uses two horizontal rods to support a part by two through-holes, and if the part slips so that one of the rods comes free of the through-hole, then the part may rotate, hang from the lone rod still supporting it, and swing outside the cassette. The part could even fall to the ground, damaging the part and leaving no part for the robot to pick from the cassette.

Since an indexing cassette moves parts mechanically, the foremost part may not be presented correctly if a mechanical failure occurs. Mechanical interference could prevent completion of an indexing move, leaving the part and its fixture short of the intended location. If the mechanism jams, the part may not move at all. The cassette may index a part into the foremost position as expected, but due to improper communications or timing, the part may not be present when expected by the robot program. It is desirable that some apparatus and method be applied to detect whether the next part to be picked up has not been indexed into position at the expected location, orientation, and time.

Machine vision systems have been provided as a solution to verify that the pose of the foremost part is suitable for robot pick. However, robot guidance for cassette pick poses several problems for cassette pick.

Cassettes may present relatively large parts or subassemblies for picking. The part to be picked from the cassette will typically be exposed to ambient lighting conditions, which could be very bright factory lighting. Machine vision systems that image visible light are difficult to make robust for inspections of large objects by ambient light.

Robustness of such systems may be achieved in some cases at great expense, or by spending considering effort to design a work cell around the lighting requirements of a 2D vision system. It would be preferable to install a sensor that does not require additional illumination, and that can yield accurate 3D data whether ambient lighting is intense or not.

If the vision system infers the pose of the part from 2D images, then imaging a large part may require multiple sensors, and using multiple 2D sensors to yield 3D data complicates setup.

Setup for a system that yields 3D data using multiple 2D sensors must typically be customized for each application, and this setup relies on the judgment of a trained engineer. Ambient light, shadows, and other environmental conditions can confuse 2D image processing algorithms. 2D cameras are limited in their ability to determine distance across a wide field of view. Using multiple 2D sensors to yield 3D data within the region of overlapping fields of view requires more hardware and complicates installation and setup.

Machine vision systems limited to estimating relatively small changes in object pose are not suitable for cassette pick applications. If mechanical fixturing fails and the part swings free, the part may assume an arbitrary pose.

Sealant Dispensing Application

In vehicle manufacturing, inner and outer stamped metal parts are joined to create doors, hoods, trunks, and other closures by hemming. A hem flange is formed by folding the edge of an outer metal stamped part over the edge of an inner metal stamped part. Typically, a robot applies a liquid sealant to the hem to create a watertight seal between the inner and outer panels.

If the hem flange is not in the precise pose for which the robot's motion path was trained, the sealant the robot sprays or dispenses may fail to cover the hem. The spray may miss the closure altogether and splash on the vehicle body or other objects in the work cell, creating a mess that may require an expensive downtime for cleanup. If the closure and its hem flange are not in the expected pose, the robot may even crash into the closure, and robot collisions are expensive.

Although determination of the pose of an imprecisely fixtured part is a problem to be solved for many manufacturing applications, determination of the pose of a hem flange presents particular difficulties and constraints.

If sealant is to be applied to a closure already attached to a car body, then the pose of the hem flange will be determined by the pose of the vehicle relative to the production line, and the pose of the closure relative to the vehicle body. Given this compound effect, the pose of a closure may vary considerably relative to the fixed location of the robot.

One problem in determining the pose of a hem flange is the accuracy required for pose measurement relative to the size and shape of the part. A closure with hem flanges can measure one meter or longer along the longest dimension, yet accuracy of 1 mm or less may be required for the placement of the sealant along the hem. Positional accuracies of 1 part in 1000 can be difficult to achieve outside the lab, especially for complexly shaped parts. In addition, on the order of magnitude of 1 mm, the required measurement accuracy is comparable to as-built dimensional differences between parts, and in some cases may be comparable to the flex of a part from non-rigid deformation under the force of gravity or the clamping force of mechanical fixturing.

The vehicle manufacturer would prefer to apply a thin, even bead of sealant along the entire flange, and this is possible only if the robot's sprayer or applicator is maintained at a consistent distance and orientation relative to the hem flange.

Another difficulty is that the hem flange around a closure such as a door or hood can trace a complicated curved path through 3D space, making the application particularly sensitive to errors in the measurement of orientation. If the pose measurement is inaccurate in overall location of the closure such that the every point on the hem flange is measured to be 1 mm away from its actual location then the accuracy of sealant spraying may not suffer, but if orientation of the closure is measured inaccurately such that the top of the closure is shifted one or more millimeters in one direction from the measured pose, and the bottom of the closure is shifted one or more millimeters in the opposite direction, the robot will not follow the complex curve of the hem flange accurately, and the center of the sealant bead may wander in a complicated pattern relative to the hem flange.

If the orientation of the part is measurement inaccurately, then after the measured pose is applied to the robot's motion path, the robot's sprayer may be oriented at an oblique angle relative to the surface. Spraying at an oblique angle can widen the sealant bead and misalign the center of the bead with respect to the hem as shown in FIG. 23.

Since high accuracy relative to the size of the closure is required, and since 3D measurement error increases with distance, it is preferable to mount a sensor to the robot itself. Robot-mounted sensors make it straightforward to maintain a consistent, close distance from sensor to hem flange.

The error of 3D measurement increases with distance. For camera-based 3D distance, objects that are farther away will appear smaller in the camera image. Accuracy of distance measurement is typically proportional to the square of the distance. For example, a sensor that yields 3D measurements with 1 millimeter error at 1 meter distance may yield 3D measurements with 4 millimeters error at 2 meters distance.

Pose estimation of a closure or other large vehicle subassembly will typically rely on the assumption that the closure is a rigid body which assumption may not always be true.

Some solutions to the above-noted problem may not be able to measure the pose of a closure along, given the wide range of poses the closure can assume. Instead, the pose of the vehicle body may need to be determined first. The vehicle pose may be used to position a pose measurement sensor, and then the sensor measures the closure pose relative to the body pose. The pose of the closure in the robot coordinate frame is the product of the vehicle-to-robot pose and the closure-to-vehicle pose.

The constraint that robot-mounted sensors should be small and lightweight discourages the use of large and/or heavy sensors that might otherwise make depth measurements accurate enough for hem flange pose measurement. For example, the Zivid 3D sensor is relatively large with a longest dimension of 226 mm and relatively heavy at 2 kg.

A robot end-of-arm tool is designed primarily for the robot's work task: spraying paint or sealant, holding a welding gun, grasping a part, or the like. Sensors added to the robot end-of-arm tool should occupy as little of the end-of-arm tool as possible. It should not be necessary to design an end-of-arm tool to accommodate a large or heavy sensor.

A small and lightweight sensor is preferable to a large and heavy sensor for robot-mounted sensor, assuming sensor depth measurement accuracy is comparable.

Machine vision systems may determine pose by estimating the locations in 3D space of optically distinguishable features such as holes and edges. Such systems may use robot-mounted sensors, but the robot may need to move the sensor to multiple viewpoints of the closure. Since point-based pose measurement accuracy is limited by the number and accuracy of points measured, and since pose measurement of a closure and its hem flange demand high accuracy, it is necessary to achieve high accuracy in the measurement of individual features and their position in 3D space.

As is well known to those trained in the art of geometry and 3D measurement, at least three points are required to uniquely and unambiguously determine the pose of an object in 3D space. Robustness of measurement may be improved by measuring four or more points and then applying a least squares fit or other common mathematical technique to find a best fit solution. However, for a feature-based machine vision measuring more points requires making more choices about features and feature-finding algorithms, so improvements in robustness may be achieved in exchange for greater complexity of setup.

If the robot brings a sensor near to the closure, then features may be resolved with sufficient accuracy. But at a near distance the sensor field of view will be relatively small, and typically too small to image more than a small portion of the closure. To measure the pose of the closure, features in at least three different locations will need to be measured, and preferably the locations of the features would be far apart to yield a more accurate pose. However, if the sensor field of view is too small to image the entire closure, multiple robot moves will be required to measure necessary features. Robot moves add to the overall cycle time for the sealant operation. It would be preferable to minimize the number of moves, and thus minimize cycle time.

Feature-based measurement systems that determine pose by measuring the locations in 3D space of optically distinguishable features typically assume that a closure is a rigid body. If measurement accuracy is required to be 1 mm or less, then feature-based machine visions systems may not be possible.

Vehicle Body Application

When a vehicle body on an assembly line moves into a robot work cell, the vehicle body is typically shifted slightly relative to the nominal pose used to train the robot's motion paths. The pose of an object is the position and orientation of the object in 3D space. Since vehicle bodies are typically not fixtured precisely, some method and apparatus are necessary to determine the pose of the vehicle body.

A vehicle body on the assembly line is mounted to a car carrier, and the car carrier rides on the assembly line. From vehicle to vehicle on the line, the position and orientation of the vehicle to its car carrier will vary, and the position and orientation of the car carrier relative to the assembly line will vary.

Vehicle bodies typically measure 4 meters in length or more, so if the vehicle pose is to be measured by a sensor-based system such as a machine vision system, then it is typically not possible to measure the pose of the vehicle body with only one sensor. Installing and configuring multiple sensors can be further complicated if parameters must be configured uniquely for each sensor, as is the case for systems that determine pose by measuring the positions in space of optically distinguishable features.

Vehicle bodies are composed of multiple subassemblies. Although modern manufacturing methods typically ensure that the dimensions of an as-built vehicle are within tolerance, an assembly may be installed slightly out of position such that the pose of the current body can no longer be rigidly transformed to match the pose of the reference body in the reference pose. If the pose measurement system uses a feature on the shifted subassembly as one of its measurement points for the pose of the vehicle body, then it may be difficult to determine whether that point has been measured inaccurately, or whether the subassembly on which the point is found is out of position. When it is difficult to determine the source of such a problem, it is also difficult to determine appropriate corrective action, and attempts to resolve a sporadic vehicle build problem by retraining the vision system may prove fruitless.

Sensors to measure vehicles bodies are often mounted statically to the floor or ceiling. Sensor location relative to the body may be determined in part by the shape and appearance of the vehicle body. Vehicle bodies may be assembled from a combination of subassemblies that have holes, protrusions, concavities, and other sharp features and of subassemblies that are smoothly curved and practically featureless. Featureless subassemblies cannot be measured by feature-based machine vision systems. Measurement of bodies with featureless surfaces may require sensors to be mounted such that they only image surfaces rich in features, but those features may only be visible in locations that are be inconvenient for installation and maintenance. It would be preferable to be able to mount sensors at any arbitrary number of locations rather than only in certain locations dictated by the limitations of the measurement system.

Vehicle pose can be determined using multiple laser triangulation sensors such as the Tricam sensor from Perceptron. However, laser triangulation sensors require significant effort to set up and service.

Laser triangulation sensors must be installed in locations and orientations that are known precisely. The locations and orientations are typically determined using range-finding apparatus that require significant expertise to operate. It may take hours to install a laser triangulation sensor and register the sensor's measurements into a robot coordinate frame or world coordinate frame fixed relative to the floor of the assembly line.

If a triangulation sensor is bumped, or if it shifts over time, it must typically be re-registered using the same range-finding equipment used for initial installation. This is known to be a time-consuming process by those experienced in the arts of 3D sensing.

In addition, laser triangulation sensors generate relatively little surface data unless the laser lines is scanned across the surface.

Devices for the calculation of a limited set of range data from an electronic representation of a visible scene are also well known in the prior art. Typically, these devices employ a 2D sensor and one or more beams of radiation configured so that the beams of radiation intersect an object in the field of view of the 2D sensor, and some radiation from those beams is reflected by that object back to the 2D sensor. The mathematics of triangulation is used to calculate the range to the object for those pixels illuminated by the beam(s) of radiation (see, for example, U.S. Pat. Nos. 3,180,205 and 4,373,804). Using terms of the art: a picture element (designated by its horizontal and vertical coordinates within an imaging array) for which range data is known is termed a volume element or 'voxel.' Techniques similar to those disclosed in U.S. Pat. Nos. 3,180,205 and 4,373,804 generate a relatively small set of range data.

The limited data generated by a laser triangulation sensor was overcome by the invention of three-dimensional sensors which produce range data for all, or nearly all, picture elements in their imaging arrays, and hence much more complete range data for objects in their fields of view. See, for example, U.S. Pat. No. 4,195,221, which utilizes time of flight techniques, U.S. Pat. No. 5,081,530 which utilizes scanning beam techniques, or U.S. Pat. No. 6,751,344 which utilizes projected patterns to obtain voxels over an extended field of view. In recent years, the ideas in these early patents have been developed further so that relatively inexpensive consumer-grade 3D sensors are available commercially. For example, a 3D sensor based on the time of flight principle is the Sony DepthSense. A 3D sensor that derives depth from projected structured light is the Orbbec Astra. A 3D sensor that utilizes a scanning beam technique is the LMI Gocator.

Although the laser line can be mechanically scanned across the surface to generate a more complete cloud of 3D voxels, mechanically scanned laser triangulation sensors are inefficient. The introduction of low-cost hybrid 2D/3D sensors obviated the need for laser triangulation sensors for many applications.

A triangulation sensor may yield a 3D cloud of a part surface by mechanically scanning the triangulation beam across the target. However, the time required to mechanically scan the sensor adds to the total cycle time. The triangulation sensor may move its beam, or the part may move relative to a fixed beam, but the relative motion of laser beam and data acquisition must be synchronized.

If a triangulation sensor uses a pentaprism or other device to mechanically scan a surface, then the mechanical component can fail through repeated use.

A hybrid 2D/3D sensor or camera acquires complete clouds of hundreds of thousands of 3D voxels thirty times per second. No mechanical scanning is required, so mechanical failure is not expected. Examples of such sensors and cameras can be found in U.S. patent documents 2013/0329012; 2018/0031364; 2018/0120218 and U.S. Pat. No. 10,049,443.

Machine vision systems comprised of multiple 2D sensors and application-specific lighting may also be used to determine the pose of a vehicle body. However, using multiple 2D sensors to yield 3D data complicates setup.

Vehicle pose may be determined by scanning laser triangulation sensors such as the Perceptron Helix-Evo. Although scanning laser triangulation sensors generate more data than traditional fixed-position triangulation sensors, mechanically scanned laser triangulation sensors are inefficient.

Vehicle Roof Ditch Application

In automotive manufacturing, a vehicle roof may have roof ditches. A roof ditch is a lengthwise recess in the stamped metal roof. The roof ditch can serve to attach roof panels but may also allow a molding to be attached for cosmetic reasons, or a roof rack to be attached for hauling cargo.

A roof ditch may be a recess of gentle curves that has few if any holes or other optically distinguishable features. Optical pose measurement systems would typically use such optically distinguishable features to determine the location of individual points on the surface. Given 3D spatial locations of three or much such optically distinguishable points, the pose of the roof can be estimated. "Featureless" vehicle parts such as smooth roof ditches present a problem to pose measurement systems since the pose of a featureless part cannot be measured by a feature-based or edge-based machine vision system.

The width of the roof ditch may vary depending on as-built dimensions of the roof. If measurements of the pose of the roof and its roof ditches depends on the width of the roof ditches, then changes in the roof ditch width can lead to inaccuracy in pose measurement.

Many assembly lines build multiple models of vehicles. A system for pose measurement of roof ditches must measure the pose for any model. When holes or other optically distinguishable features are present, allowing a roof ditch to be measured by a feature-based machine vision system, the positions of those holes or optically distinguishable features are likely to change from one model to the next. Feature-based measurement systems must either install additional sensors to accommodate the differing locations of identifiable features or must be parameterized uniquely for each model. Preferably, a measurement system would use a small number of sensors, and ad hoc parameterization would not be necessary to accommodate different vehicle models and different roof ditch configurations.

Since a roof may be composed of independent left and right roof panels, if a build problem occurs such that positional relationship between the left roof panel and right roof panel is out of tolerance, this problem may not be detected until the pose is measured for each roof ditch. If a system determines pose using relatively few points for each roof panel, then if the roof ditches do not maintain a consistent rigid relationship to one another, then using a feature-based machine visions system it may be difficult to demonstrate whether the unexpected pose difference between left and right roof panels is inaccuracy of measurement or a build problem. Preferably, feedback from the measurement system would make immediately clear whether a roof panel is shifted relative to the other roof panel.

Machine vision systems that rely on detection of features such as holes and edges require the engineer setting up the system to make a series of choices about which features to select, and sometimes even what algorithms to use to find these features. This amounts to an ad hoc series of choices made for each application, and sometimes for each part type, and ad hoc parameterization of machine vision systems is inefficient.

Some feature-based machine vision systems may measure roof ditch pose based on the assumption that the roof ditch is a fixed width. In manufacturing, the roof ditch may vary in width, which can pose a problem for machine vision systems that assume a fixed width.

SUMMARY OF EXAMPLE EMBODIMENTS

An object of at least one embodiment of the present invention is to provide a machine vision-based method and system to measure pose of a part or assembly of parts accurately, efficiently and without ad hoc parameterization of the machine vision system.

Another object of at least one embodiment of the present invention is to provide a machine vision-based method and system for controlling a reprogrammable industrial automation machine, such as a robot, to perform a work task on a part or a subassembly of parts which has an unknown pose by measuring the pose using a machine vision subsystem.

In carrying out the above objects and other objects of at least one embodiment of the present invention, a machine vision-based method of controlling a reprogrammable industrial automation machine to perform a work task on a part or a subassembly of parts which has an unknown pose is provided. The method includes the steps of mounting at least one 3D sensor on an industrial automation machine to move therewith. The machine is programmed to follow a nominal motion path based on a known reference pose of a reference part or subassembly of parts. The method also includes providing a reference cloud of 3D voxels which represent a reference surface of the reference part or subassembly having the known reference pose. The machine and each mounted 3D sensor are mounted together to acquire a sample cloud of 3D voxels which represents a corresponding surface of a sample part or subassembly of the same type as the reference part or subassembly. The sample part or subassembly has an actual pose different from the reference pose.

The voxels of the sample and reference clouds are processed utilizing a matching algorithm to determine the pose of the sample part or subassembly. A reference-to-sample transform is applied to the nominal motion path to reprogram the machine so that the machine follows a corrected motion path to compensate for the difference between the reference and actual poses.

The step of providing may be at least partially performed by the at least one mounted 3D sensor.

The part or subassembly may be located and supported in a fixture.

The method may further include calculating an aligned cloud of 3D voxels which represents a best fit of the reference and sample clouds and displaying a 3D graphic of the aligned cloud and the reference cloud on a 3D display.

The 3D display may be used to identify whether a subassembly of parts is out of place with respect to other subassemblies of a body of subassemblies.

The 3D display may be used to visually compare pose of the aligned cloud with the pose of the reference cloud.

The machine may be a robot having end-of-arm tooling on which the at least one 3D sensor is mounted. The robot may be capable of picking the part or subassembly out of the fixture based on the corrected motion path.

The machine may be a robot having end-of-arm tooling on which at least one 3D sensor is mounted. The robot may be capable of dispensing sealant on a seam of a subassembly of parts to join the parts based on the corrected motion path.

The fixture may comprise a part or a subassembly of parts.

The fixture may comprise a moveable carrier.

The carrier may be a storage rack for locating and supporting a plurality of individually fixtured parts or subassemblies of the same type.

The carrier may be a storage cassette for locating and supporting a plurality of individually fixtured parts or subassemblies of the same type.

The carrier may be a car carrier for locating and supporting a plurality of individually fixtured vehicle bodies of the same type.

Each 3D sensor may comprise a hybrid 2D/3D sensor.

Each sensor may project a known pattern of radiation to illuminate the part or subassembly with illumination.

The illumination may be concentrated in the pattern outside of the spectrum of visible radiation.

The transform may be a best fit rigid transform. The part or subassembly may be non-rigid, wherein the method may further comprise the step of applying a best fit non-rigid transform to the nominal motion path after the step of applying.

The clouds of 3D voxels may include color or grayscale information for each voxel to enhance the pose measurement.

The reference cloud may represent substantially the entire reference surface.

The step of providing may include the steps of providing a CAD model of the part or subassembly and converting the CAD model into the reference cloud.

The step of providing may include the steps of rigidly fixturing an as-built part and capturing a plurality of reference clouds of 3D voxels from multiple viewpoints using a plurality of 3D sensors.

The step of capturing may be at least partially performed by mounting the plurality of 3D sensors on end-of-arm tooling of a robot to move therewith and causing the robot to move the 3D sensors to the multiple viewpoints.

Further, in carrying out the above objects and other objects of at least one embodiment of the present invention, a machine vision-based method of measuring 3D pose of a part or subassembly of parts having an unknown pose is provided. The method includes providing a reference cloud of 3D voxels which represent a reference surface of a reference part or subassembly having a known reference pose. The method further includes using at least one 2D/3D hybrid sensor to acquire a sample cloud of 3D voxels which represent a corresponding surface of a sample part or subassembly of the same type as the reference part or subassembly. The sample part or subassembly has an actual pose different from the reference pose. Finally, the voxels of the sample and reference clouds are processed utilizing a matching algorithm to determine the pose of the sample part or subassembly.

The step of providing may be at least partially performed by the at least one sensor.

The part or subassembly may be located and supported in a fixture.

The method may further comprise calculating an aligned cloud of 3D voxels which represents a best fit of the reference and sample clouds and displaying a 3D graphic of the aligned cloud and the reference cloud on a 3D display.

The 3D display may be used to identify whether a subassembly of parts is out of place with respect to the other subassemblies of a body of subassemblies.

The 3D display may be used to visually compare pose of the aligned cloud with the pose of the reference cloud.

The fixture may comprise a part or a subassembly of parts.

The fixture may comprise a moveable carrier.

The carrier may be a storage rack for locating and supporting a plurality of individually fixtured parts or subassemblies of the same type.

The carrier may be a storage cassette for locating and supporting a plurality of individually fixtured parts or subassemblies of the same type.

The carrier may be a car carrier for locating and supporting a plurality of individually fixtured vehicle bodies of the same type.

Each sensor may project a known pattern of radiation to illuminate the part or subassembly with illumination.

The illumination may be concentrated in the pattern outside of the spectrum of visible radiation.

The clouds of 3D voxels may include color or grayscale information for each voxel to enhance the pose measurement.

The reference cloud may represent substantially the entire reference surface.

The step of providing may include the steps of providing a CAD model of the part or subassembly and converting the CAD model into the reference cloud.

The step of providing may include the steps of rigidly fixturing an as-built part and capturing a plurality of reference clouds of 3D voxels from multiple viewpoints using a plurality of 3D sensors.

Still further in carrying out the above objects and other objects of at least one embodiment of the present invention, a machine vision-based system for controlling a reprogrammable industrial automation machine to perform a work task on a part or a subassembly of parts which has an unknown pose is provided. The system includes at least one 3D sensor mounted on an industrial automation machine to move therewith. The machine is programmed to follow a nominal motion path based on a known reference pose of a reference part or subassembly of parts. A reference cloud of 3D voxels which represent a reference surface of the reference part or subassembly having the known reference pose is included. A mechanism moves the machine and each mounted 3D sensor together to acquire a sample cloud of 3D voxels which represents a corresponding surface of a sample part or subassembly of the same type as the reference part or subassembly. The sample part has an actual pose different from the reference pose. At least one processor processes the voxels of the sample and reference clouds utilizing a matching algorithm to determine the pose of the sample part or subassembly. Control logic applies a reference-to-sample transform to the nominal motion path to reprogram the machine so that the machine follows a corrected motion path to compensate for the difference between the reference and actual poses.

The at least one mounted 3D sensor may provide the reference cloud.

The part or subassembly may be located and supported in a fixture.

The at least one processor may calculate an aligned cloud of 3D voxels which represents a best fit of the reference and sample clouds, wherein the system may further comprise a 3D display to display a 3D graphic of the aligned cloud and the reference cloud.

The 3D display may be used to identify whether a subassembly of parts is out of place with respect to other subassemblies of a body of subassemblies.

The 3D display may be used to visually compare pose of the aligned cloud with the pose of the reference cloud.

The machine may be a robot having end-of-arm tooling on which the at least one 3D sensor is mounted.

The robot may be capable of picking the part or subassembly out of the fixture based on the corrected motion path.

The machine may be a robot having end-of-arm tooling on which at least one 3D sensor is mounted.

The robot may be capable of dispensing sealant on a seam of a subassembly of parts to join the parts based on the corrected motion path.

The fixture may comprise a part or a subassembly of parts.

The fixture may comprise a moveable carrier.

The carrier may be a storage rack for locating and supporting a plurality of individually fixtured parts or subassemblies of the same type.

The carrier may be a storage cassette for locating and supporting a plurality of individually fixtured parts or subassemblies of the same type.

The carrier may be a car carrier for locating and supporting a plurality of individually fixtured vehicle bodies of the same type.

Each 3D sensor may comprise a hybrid 2D/3D sensor.

Each sensor may project a known pattern of radiation to illuminate the part or subassembly with illumination.

The illumination may be concentrated in the pattern outside of the spectrum of visible radiation.

The transform may be a best fit rigid transform. The part or subassembly may be non-rigid, wherein the control logic applies a best fit non-rigid transform to the nominal motion path after the control logic applies the best fit rigid transform.

The clouds of 3D voxels may include color or grayscale information for each voxel to enhance the pose measurement.

The reference cloud may represent substantially the entire reference surface.

The system may further comprise a CAD model of the part or subassembly wherein the control logic may convert the CAD model into the reference cloud.

The system may further comprise a fixture to rigidly fixture an as-built part and a plurality of sensors to capture a plurality of reference clouds of 3D voxels from multiple viewpoints.

The plurality of 3D sensors may be mounted on end-of-arm tooling of a robot to move therewith and the mechanism may cause the robot to move the 3D sensors to the multiple viewpoints.

Yet, still further in carrying out the above objects and other objects of at least one embodiment of the present invention, a machine vision-based system for measuring 3D pose of a part or subassembly of parts having an unknown pose is provided. The system includes a reference cloud of 3D voxels which represent a reference surface of a reference part or subassembly having a known reference pose. At least one 2D/3D hybrid sensor acquires a sample cloud of 3D voxels which represent a corresponding surface of a sample part or subassembly of the same type as the reference part or subassembly. The sample part or subassembly has an actual pose different from the reference pose. At least one processor processes the voxels of the sample and reference clouds utilizing a matching algorithm to determine the pose of the sample part or subassembly.

The at least one sensor may provide the reference cloud.

The part or subassembly may be located and supported in a fixture.

The at least one processor may calculate an aligned cloud of 3D voxels which represents a best fit of the reference and sample clouds, wherein the system may further comprise a 3D display to display a 3D graphic of the aligned cloud and the reference cloud.

The 3D display may be used to identify whether a subassembly of parts is out of place with respect to other subassemblies of a body of subassemblies.

The 3D display may be used to visually compare pose of the aligned cloud with the pose of the reference cloud.

The fixture may comprise a part or a subassembly of parts.

The fixture may comprise a moveable carrier.

The carrier may be a storage rack for locating and supporting a plurality of individually fixtured parts or subassemblies of the same type.

The carrier may be a storage cassette for locating and supporting a plurality of individually fixtured parts or subassemblies of the same type.

The carrier may be a car carrier for locating and supporting a plurality of individually fixtured vehicle bodies of the same type.

Each sensor may project a known pattern of radiation to illuminate the part or subassembly with illumination.

The illumination may be concentrated in the pattern outside of the spectrum of visible radiation.

The clouds of 3D voxels may include color or grayscale information for each voxel to enhance the pose measurement.

The reference cloud may represent substantially the entire reference surface.

The system may further comprise a CAD model of the part or subassembly, wherein the control logic may convert the CAD model into the reference cloud.

The system may further comprise a fixture to rigidly fixture an as-built part and a plurality of sensors to capture a plurality of reference clouds of 3D voxels from multiple viewpoints.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
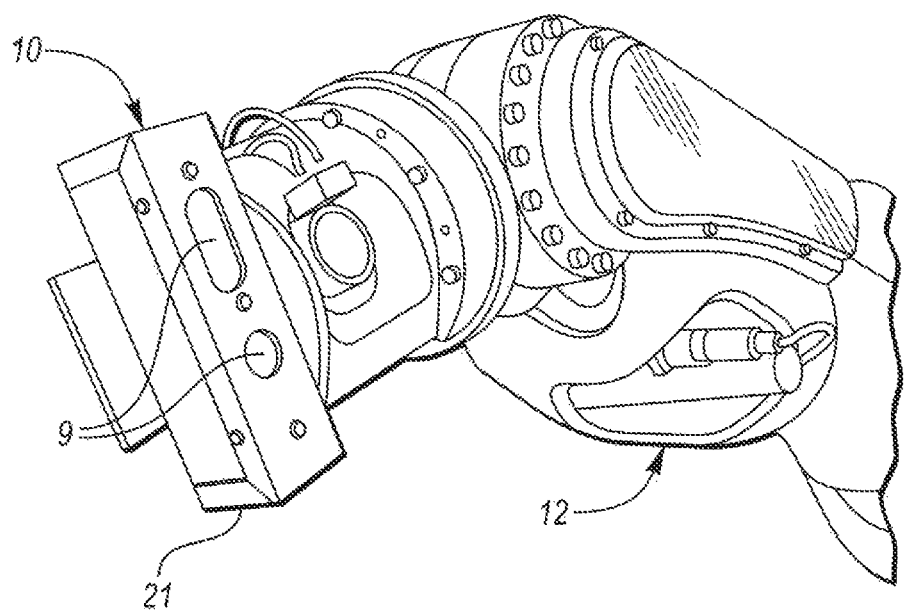
FIG. 1 is a perspective view, partially broken away, of an optical sensor enclosed or housed within an enclosure and mounted on end-of-tooling of a robot arm wherein optically transparent windows of the sensor are shown.
Figure 2:
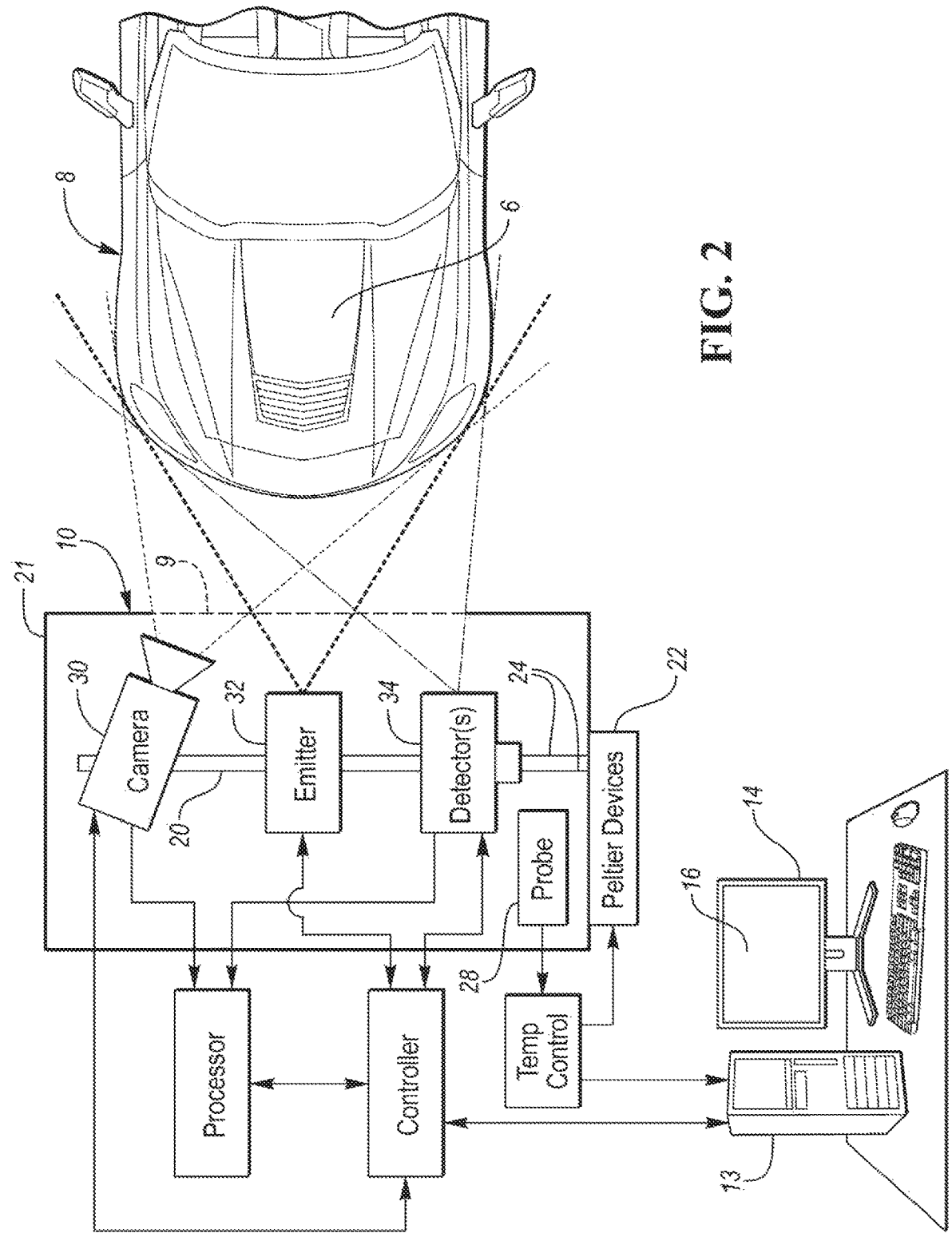
FIG. 2 is a block diagram of a 3D or depth sensor and its enclosure and sensor rail and a temperature control circuit being used in an industrial working environment.

The method and system of at least one embodiment of the present invention includes a 3D or depth sensor such as 2.5D volumetric or 2D/3D hybrid sensor. FIG. 1 shows a housing or container 21 of such a sensor, generally indicated at 10, mounted on the distal end of a robot arm 12. FIG. 2 shows the sensor 10 positioned near a vehicular body 8 including a hood 6 supported on a vehicle carrier in an industrial work environment.

The sensor 10 preferably comprises a pattern projector or emitter 32 operating at some wavelength one 'L', or more cameras or detectors 34 configured to receive light at wavelength 'L', and a visible light, monochromatic or color camera 30 configured to view light at visible wavelengths, but to reject light near wavelength 'L'. The pattern is projected by the emitter 32 onto the surface of the vehicle and is read by one or more detectors 34 along with the information from the visible light camera 30. The laser projector 32 operates by means of diffractive optical elements to project several tens of thousands of laser pencils or beams onto a scene to be analyzed. The detector 34 analyzes the scene at wavelength 'L' to locate the intersections of the laser pencils with the scene and then uses geometry to calculate the distance to objects in the scene. The visible light camera 30 in a preferred embodiment is used to associate a color or monochrome intensity to each portion of the analyzed image.

The pattern emitter 32 may be comprised of an infrared laser diode emitting at 830 nm and a series of diffractive optics elements. These components work together to create a laser "dot" pattern. The laser beam from the laser diode is shaped in order to give it an even circular profile then passed through two diffractive optics elements. The first element creates a dot pattern containing dots, the second element multiplies this dot pattern into a grid. When the infrared pattern is projected on a surface, the infrared light scattered from the surface is viewed by one or more detectors 34 configured to be sensitive in the neighborhood of 830 nm.

In addition to the IR sensor 34, there may be the RGB sensor or camera 30 configured to be sensitive in the visible range, with a visible light, band-pass filter operative to reject light in the neighborhood of 830 nm. During operation, the IR sensor 34 is used to calculate the depth of an object and the RGB sensor 30 is used to sense the object's color and brightness. This provides the ability to interpret an image in what is traditionally referred to as two and a half dimensions. It is not true 3D due to the sensor 10 only being able to detect surfaces that are physically visible to it (i.e., it is unable to see through objects or to see surfaces on the far side of an object).

Multiple volumetric sensors may be placed in key locations around and above the vehicle. Each of these sensors typically captures hundreds of thousands of individual points in space. Each of these points has both a Cartesian position in space and an associated RGB color value. Before measurement, each of these sensors is registered into a common coordinate system. This gives the present system the ability to correlate a location on the image of a sensor with a real-world position. When an image is captured from each sensor, the pixel information, along with the depth information, is converted by a computer 13 (i.e. FIG. 2) into a collection of points in space, called a "point cloud".

A point cloud is a collection of data representing a scene as viewed through a "vision" sensor. In three dimensions, each datum in this collection might, for example, consist of the datum's X, Y and Z coordinates along with the Red, Green and Blue values for the color viewed by the sensor 10 at those coordinates. In this case, each datum in the collection would be described by six numbers. To take another example: in two dimensions, each datum in the collection might consist of the datum's X and Y coordinates along with the monotone intensity measured by the sensor 10 at those coordinates. In this case, each datum in the collection would be described by three numbers.

The computer 13 of FIG. 2 controls a controller which, in turn, controls a processor, a temperature controller, the camera 30, the emitter 32 and the detector 34 of the sensor 10.

At least one embodiment of the present invention uses a hybrid 2D/3D sensor 10 to measure color, brightness and depth at each of hundreds of thousands of pixels. The collective 3D "point cloud" data may be presented on a screen 16 of a display 14 (i.e. FIG. 2) as a 3D graphic.

The field of view of the 2D/3D sensor 10 can be as wide as several meters across, making it possible for the user to see a hinged part such as a door or the hood 6 relative to the vehicle body 8 in 3D. The graphic on the screen 16 may look like the 3D part the user sees in the real world.

Figure 3:
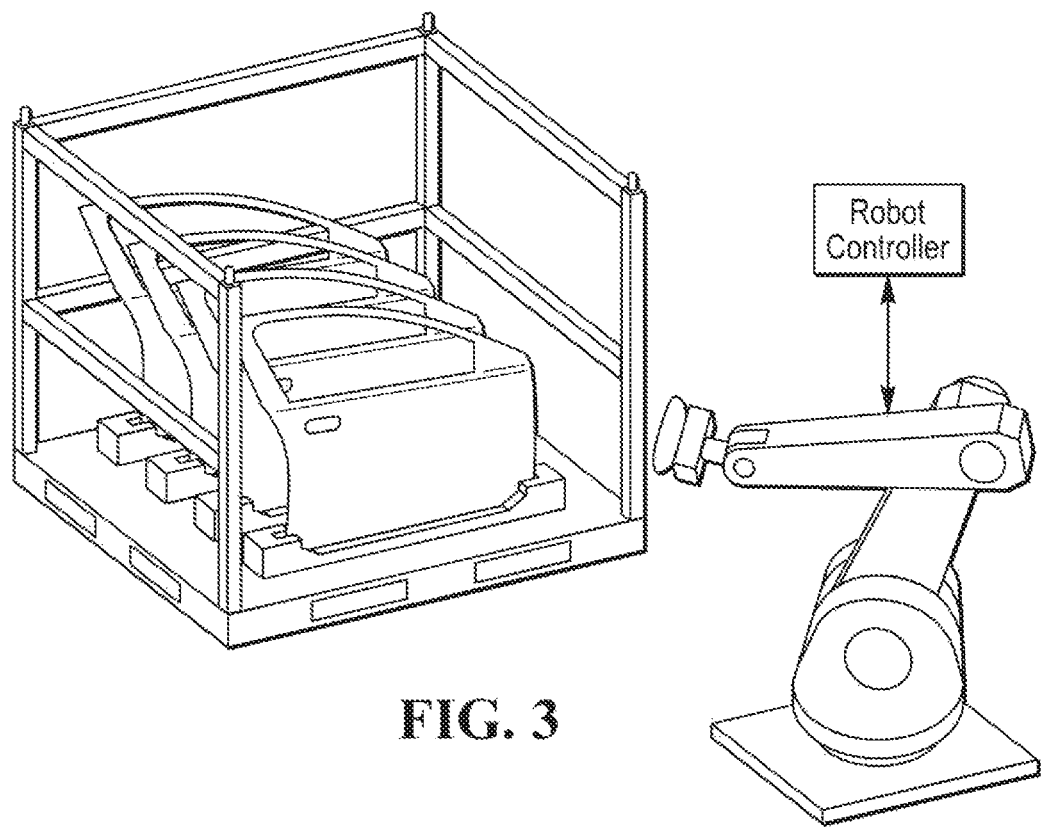
FIG. 3 is a front schematic, perspective view of a conventional storage rack full of automotive parts such as doors and a robot to remove the parts one at a time from the rack.
Figure 4:
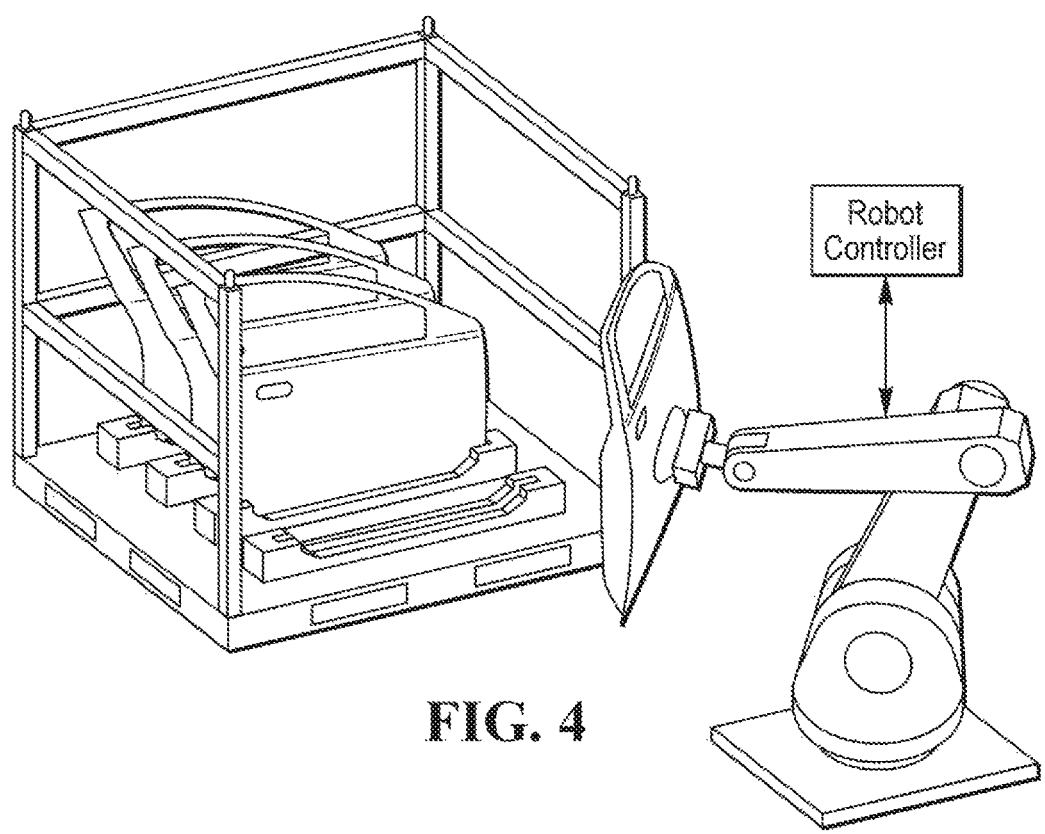
FIG. 4 is a view similar to the view of FIG. 3, but with a foremost part removed/picked from the rack and held by the robot.
Figure 5:
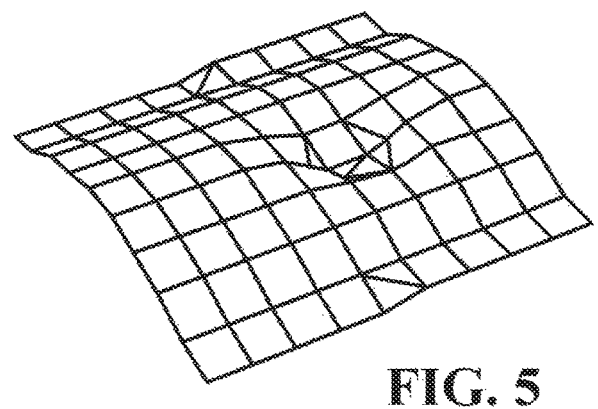
FIG. 5 is a top schematic perspective view of a mesh which represents a 3D reference cloud of voxels captured for a gently curved surface of a stamped metal part.
Figure 6:
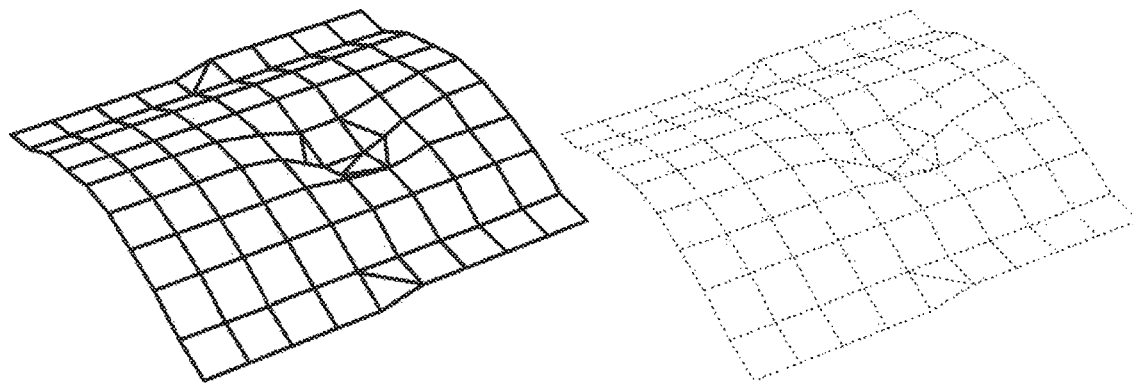
FIG. 6 is a view of the mesh of FIG. 5 adjacent the mesh of a sample cloud of voxels (dashed lines); the sample cloud is offset from the reference cloud by a translational shift.
Figure 7:
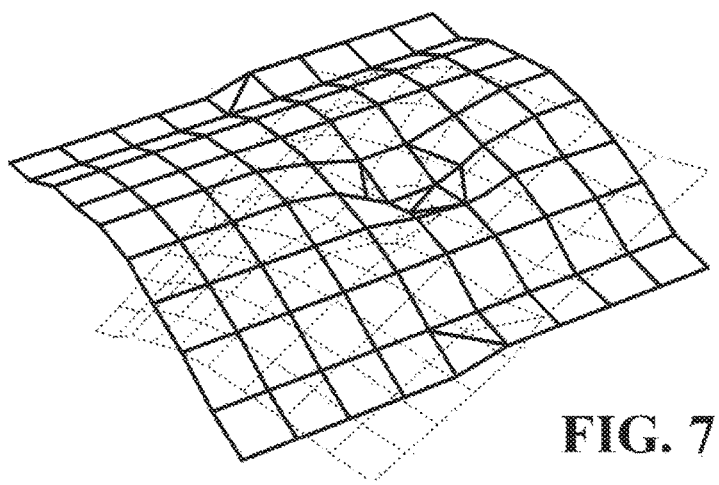
FIG. 7 is a view of the mesh (solid lines) of FIGS. 5 and 6 and the sample cloud (dashed lines) of FIG. 6; the sample cloud is offset from the reference cloud by a combination of translations and rotations.
Figure 21:
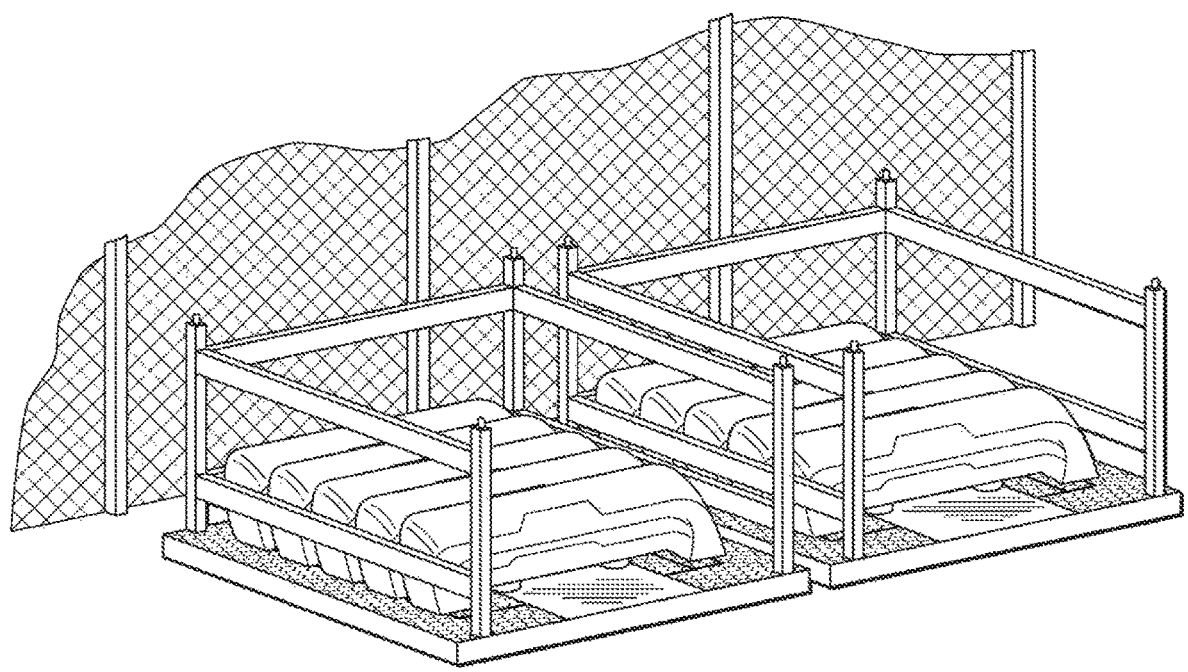
FIG. 21 is a perspective schematic view, partially broken away, of a pair of racks filled with parts and located in an industrial environment.

At least one embodiment of the present invention provides a method and apparatus to measure the pose of loosely or improperly fixtured parts in storage racks in order to properly pick the part from the storage racks as shown in FIGS. 3, 4 and 21. This embodiment improves upon the state of the art in imaging, pose measurement, system setup, and ease of installation. The method and system disclosed in U.S. Pat. No. 10,049,443 may be used not only to determine the presence or absence of objects to prevent collisions of robots with manufactured objects, but can also be employed as a subsystem of a pose measurement system to determine whether a part is present before the part's location and orientation in 3D space are measured.

Small hybrid 2D/3D sensors measure distance using pseudorandom patterns of near-infrared light that do not occur in nature or in the build environment. These patterns of projected light are unaffected by ambient visible light, so the changes in ambient lighting from the frontmost rack position and hindmost rack position become irrelevant. Similarly, shadows do not affect the distance data used in pose measurement.

Traditional machine vision systems combine 2D image sensors with engineered lighting. The lighting provides a consistent appearance of the inspection object to a 2D imaging sensor. The lighting's geometry, intensity, and mount configuration are engineered for each application. In some cases, general purpose lighting is built into the sensor housing itself to reduce the space occupied by the vision system.

Machine vision system lighting must contend with ambient factory lighting. For machine vision systems that inspect larger subassemblies measuring half a meter or more along the longest axis, it becomes progressively more difficult to provide lighting that provides consistent illumination despite changes in ambient factory lighting. Consistent illumination for larger parts typically requires large machine vision lights and shrouds that block direct interference by the brightest factory lights. Accommodating this need for lighting requires engineering resources and also occupies valuable factory floor space.

If the sensor provides its own illumination, and if this illumination uses wavelengths outside the spectrum of visible light and if the illumination is concentrated into an artificial pattern not present in natural lighting, then the sensor can operate in the presence or absence of ambient visible light. In factories ambient lighting conditions can vary widely from very bright to very dark, and the robustness of a machine vision system is improved if it is not affected by ambient lighting changes.

The sensors are small and light, and so are easily mounted to a robot end-of-arm tool. With one or more sensors mounted to the end-of-arm tool, the robot can move to a consistent distance from each nominal rack position, ensuring accuracy and repeatability of measurement better than is possible if the machine vision sensors must be mounted outside the storage rack.

This solution eliminates the need for ad hoc parameterization of part features. Eliminating ad hoc parameterization improves ease of installation and support as previously mentioned. Instead of ad hoc parameterization, the solution uses a cloud of voxels representing the surface of the part to be picked. The cloud may consist of tens of thousands or more voxels. A reference cloud is captured for the part in the frontmost rack position. A sample cloud is captured for the current part. The pose of the current part is determined as the best fit pose of its cloud to the reference cloud.

A voxel in a point cloud could be an (X, Y, Z, I) element with horizontal, vertical, depth, and monochromatic intensity, or the voxel could be an (X, Y, Z, R, G, B) element with horizontal, vertical, depth, red, green, and blue intensities, or the voxel could represent some other combination of (X, Y, Z, . . . ) values and additional magnitudes.

Eliminating the need to select application-specific measurement features removes an installation step typical in the setup of many machine vision systems. Not only is feature selection and parameterization time-consuming to learn, but it can be time-consuming even for an expert to execute during an installation.

By eliminating the need for application-specific parameters such as the selection of specific part features for measurement, the operation and maintenance of the vision system is simplified. If an installed vision system must be trained to measure the pose of a new part, there is no need to review or relearn the process by which part feature must be selected and parameterized. Preferably, the vision system is simply presented a part, the user clicks a few buttons to execute training, and then the system will be ready to measure the new part.

Finding the best fit between reference cloud and sample cloud can be conceptualized as finding the best fit between two lunch trays, each of which has square, rectangular, and circular pockets. The distance between trays can be minimized by moving and orienting one tray so that it slides into and then stacks on top of the other tray. Similarly, when two clouds are in optimal alignment, the clouds interpenetrate, and the distance between a voxel in the sample cloud and the closest voxel in the reference cloud is minimized.

The best fit of sample cloud to reference cloud is an optimization problem in six degrees of freedom: three degrees of translation and three degrees of rotation. The variable to be optimized is a statistical measure of the distance from sample voxel to closest reference voxel for all voxels. This statistical measure could be the total distance for all voxels, the mean distance for all voxels, or some other measure. Methods for optimizing a variable in six dimensions are known to those with expertise in mathematics. FIGS. 6a-6d are relevant to show interactive minimization of differences.

Figure 8:
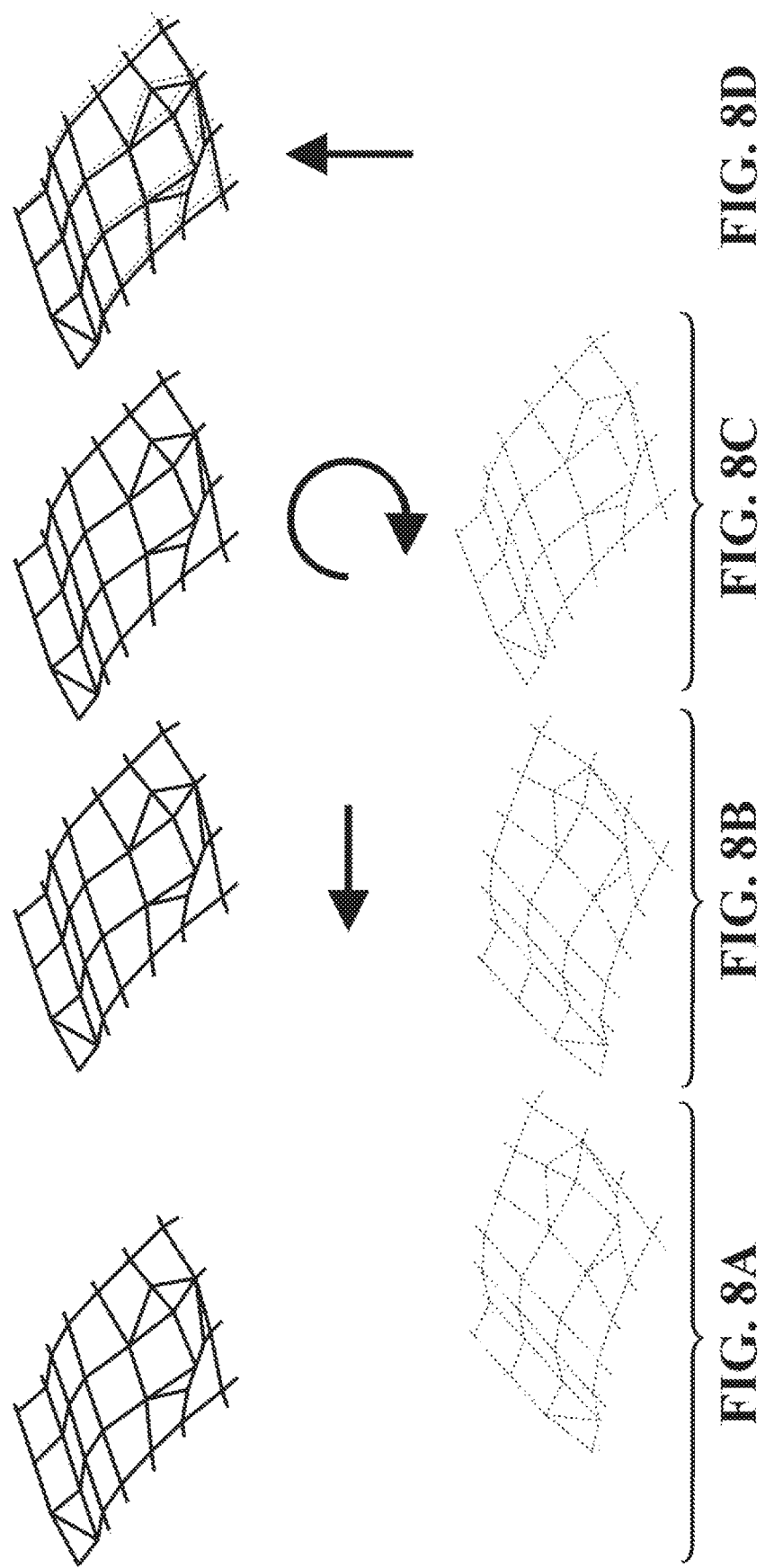
FIG. 8a-8d are mesh views which illustrate the iterative minimization of differences between reference and sample clouds; images from left to right represent the reference cloud (solid lines) and the sample cloud (dashed lines); the intersections of mesh lines represent individual voxels in 3D space.

As shown in FIGS. 5-7 and 8a-8d, translations and rotations are applied to the sample cloud to minimize the difference between each voxel in the sample cloud and the closest voxel in the reference cloud:

FIG. 8A) The sample cloud is rotated and translated relative to the reference cloud;

FIG. 8B) A translation of the sample cloud aligns the geometric centers of the reference and sample clouds along the vertical axis;

FIG. 8C) A rotation of the sample cloud aligns the peaks and valleys along the vertical axis; and FIG. 8D) A final translation along the vertical axis moves the sample cloud until it overlaps the reference cloud.

Additional iterations could further minimize the distance from each point in the sample cloud to the closest point in the reference cloud. Each iterative translation or rotation is a homogeneous 4×4 transform. The transform from the initial sample pose to the reference pose is the product of all intermediate transforms.

In practice, iterative steps could combine translational and rotational changes via multidimensional optimization using methods familiar to those skilled in mathematics.

The solution determines the best fit by calculating the spatial transform from the sample cloud to the reference cloud. The solution reports the inverse transform from the reference pose to the sample pose. The robot applies the reference-to-sample transform to all the points in its trained path, thus generating a motion path for the sample part.

The solution is well suited to measuring parts that may be subject to slight deformations that introduce additional degrees of freedom beyond the six degrees of freedom for a rigid body. Unlike systems that may use a relatively limited number of points for pose measurement, the solution uses tens of thousands or more voxels representing the entire surface. Droop, flex, and similar non-rigid deformations can be determined statistically for the distance from a sample voxel to the closest reference voxel for all voxels. For example, if the statistical mean of sample-to-reference distances is close to zero millimeters at the center of a long rectangular part, but if the mean sample-to-reference distance increases in proportion to the distance along the part from the center, then the part can be determined to be drooping or flexing. This non-rigidity can be addressed by applying a non-rigid transform after the best fit rigid transform, by dividing the reference cloud into multiple clouds and then calculating multiple piecewise rigid best fit transforms from sample to reference, or by other means familiar to those skilled in mathematics.

The solution presents reference and sample clouds in a 3D display, allowing a human operator to review the degree of interpenetration of clouds from any viewpoint in 3D space. After each measurement, the solution presents 3D graphics for three clouds: the reference cloud, the sample cloud, and an aligned cloud. The aligned cloud represents the best fit of the sample cloud to the reference cloud and is calculated by applying to the sample-to-reference transform to every voxel in the sample cloud. Each voxel may be represented in the 3D display by a cuboid assigned a color to identify the cloud to which the voxel belongs. Representing voxels as colored cuboids makes it easier to judge interpenetration of the aligned cloud with the reference cloud. For example, if from some viewpoint the voxels representing the aligned cloud appear closer and if the color of overlapping cuboids is dominated by the color of the aligned cloud, then the user can determine that the aligned cloud is closer to the viewpoint, that an additional translation would be required to bring the aligned cloud into agreement with the reference cloud, and that this translation has a component along the direction of the line of sight from that viewpoint. Similarly, rotations and non-rigid deformations of aligned cloud relative to the reference cloud can be determined by the user, typically with minimal training.

Since pose measurement of a part is determined as the best fit of the current cloud to a reference cloud, the solution can find the pose of a smoothly curved part that has no optically distinct features. The pose of parts with smoothly curved surfaces and parts with sharp protuberances and concavities can be found by finding the best fit of clouds representing the surfaces.

For each rack position the robot moves forward to a measurement position that is a consistent distance from the part in its nominal pose. The same measurement is performed at each rack position, so there is no need to modify the machine vision system or create separate parameterizations or programs for each rack position.

Clouds for very large parts can be generated by using more sensors to increase coverage. The sensors are registered into a common robot coordinate frame or world coordinate frame such that the 3D voxels in the clouds of every sensor are expressed in the same coordinates. Creating a larger cloud from multiple smaller clouds is simply a matter of superposition. If clouds overlap, then the clouds can be stitched together using techniques familiar to those skilled in mathematics and image processing. Typically, sensors are arranged spatially to capture portions of the surface at extremities of the part, so clouds may not overlap, and stitching of clouds may not be necessary.

No additional parameterization is necessary to combine clouds from multiple sensor into a single larger cloud, so adding sensors does not increase complexity of algorithmic setup. The solution accommodates an arbitrary number of sensors, so the cloud may be arbitrarily large.

The solution is robust even in the presence of partially missing or corrupted data. For a feature-based vision system, pose measurement may become impossible if a feature is occluded, or measurement may become inaccurate if the data associated with a feature is corrupted. The present solution uses clouds of voxels representing large surface. Even if the cloud is missing some data because a portion of the part is occluded, or even if some of the data is missing, there will still be many voxels with which to find a fit to the reference cloud. Minor changes in part design, as-built appearance, or as-built dimensions of a part have little effect on measurement since the cloud captured by the present solution will consist largely of voxels corresponding to unchanged surfaces.

Figure 9:
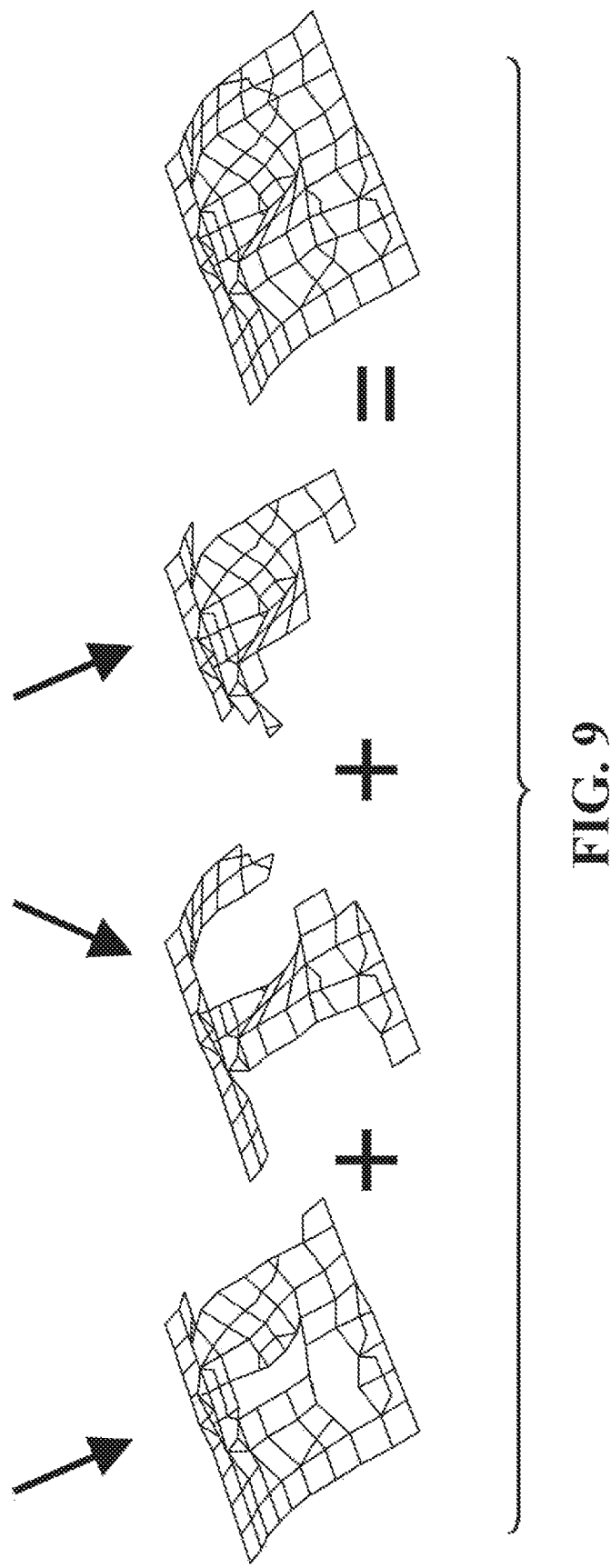
FIG. 9 are mesh views wherein the arrows indicate the lines of sight of a sensor imaging a surface with multiple protuberances.

Referring to FIG. 9, the mesh represents the cloud of voxels corresponding to the portion of the surface visible to the sensor from that viewpoint. Missing portions of the mesh represent regions of the surface not visible from a particular viewpoint either because the surface is hidden or because the surface lies outside the sensor's field of view. A complete representation of a surface can be generated even if portions of the surface are hidden from any one viewpoint. The surface is imaged from multiple viewpoints to generate multiple viewpoint-specific clouds when stitched together, the viewpoint-specific clouds form a single cloud representing the complete surface.

For certain applications requiring even better accuracy, the present solution can employ an optional refinement of pose measurement using color or grayscale information. The clouds of 3D voxels include color or grayscale information for each voxel, permitting a secondary check of pose measurement.

The clouds provided by hybrid 2D/3D sensors for each voxel has information about x,y,z coordinates in 3D space as well as color or grayscale information. Large clouds provide not only a lot of depth data, but a lot of color or grayscale data as well.

Initial pose measurement is performed using 3D depth information, given that 3D pose inferred from the relative positions of edges can be inaccurate in measurement of orientation, but color or grayscale information is suitable for refining a pose measurement. The depth data alone can be used to segment the part as the foreground from the background of the rack and other parts, thus making it possible to filter out foreground from background for the color or grayscale information.

When a part is imaged from a viewpoint, protrusions and concavities in the part surface may hide portions of the part surface from the line of sight. As the viewpoint of the part changes, either because the sensor moves or because the part pose changes, some hidden surfaces may become visible, and previously visible surfaces may become hidden. Since the pose of a sample part will typically be different from the pose of the reference part, if a sensor images both reference and samples parts from the same viewpoint, the clouds of voxels representing the surface of reference and sample parts may exhibit difference in hidden and visible surfaces. These differences in cloud representations of the part surface can be significant if the protrusions and cavities on the part are large, or if the pose of the sample part is significantly different than the reference pose. The present solution offers several approaches to mitigate this issue.

If sample pose can vary significantly from the reference pose, and if the sensor or sensors are mounted to the end-of-arm tool of a robot, then the solution can measure the pose iteratively. In the first iteration of pose measurement, the robot moves to the default position for pose measurement. If this initial measurement indicates the pose of the sample part has large translation and/or rotation relative to the reference pose, then the solution can iterate its measurement cycle to make a second measurement. The first measured pose is applied to the robot's pose measurement position to generate a shifted measurement position. In this shifted measurement position, the sensor or sensors mounted to the end-of-arm tool will be oriented such that viewpoint more closely matches the viewpoint of the part when the reference cloud was captured. From this shifted viewpoint, a newly captured sample cloud will have a surface representation that more closely matches the surface representation of the reference cloud. A second measurement is triggered, yielding a more accurate pose measurement.

Another approach to mitigate viewpoint-specific hidden and visible surfaces is to generate a reference cloud that represents the entire part surface. For example, a CAD model of the part that completely represents the exterior surface of the part can be loaded into the memory of the solution and converted to a 3D cloud of voxels. Although the cloud of the sample part may still be captured from a single viewpoint and may lack representation for surfaces hidden from the sensor's viewpoint, the pose of the sample cloud can be found precisely since the CAD reference cloud represents every exterior surface, and for every portion of the surface in the sample cloud there will be a matching portion of the surface in the complete surface cloud derived from the CAD model.

As-built parts may deviate from CAD models in dimensions and appearance. The manufacturer of a part wishing to protect the intellectual property of their designs may also be leery of providing CAD models to outside parties. Capturing a complete reference cloud of an as-built part addresses issues related to using CAD models for reference clouds. To generate a complete reference cloud of an as-built part, the part is fixtured rigidly in place and clouds are captured from multiple viewpoints.

One method to generate a complete reference cloud of an as-built part is to mount sensors to a robot, and to use the robot to visit multiple viewpoints—possibly even hundreds of viewpoints. One or more sensors are mounted to the robot end-of-arm tool. The sensors are registered into a robot coordinate frame such that each voxel in the sensor cloud is transformed into the robot coordinate frame. The robot is then programmed to move to a multitude of positions such that at each position the mounted sensor or sensors image the fixtured part from a new viewpoint. A cloud representing the part surface from this viewpoint is captured at each robot position. Since the robot position is known precisely, the cloud captured at any position can be transformed into the common robot coordinate frame. A complete reference cloud of the part is generated by stitching together the clouds captured from all viewpoints. Surfaces hidden from one viewpoint will be visible from another viewpoint, so the complete reference cloud will be devoid of hidden surfaces. Since the complete reference cloud is generated using an as-built part, the dimensions and appearance of the part will be consistent with that of other as-built parts. FIG. 9 illustrates the generation of a complete cloud from multiple viewpoints.

The same method could be applied by moving the part and keeping the sensor or sensors in a fixed position, a technique familiar to those skilled in the art of 3D scanning for use in 3D printing or reverse engineering. However, the preferred technique is to move the sensors relative to the part, and to rigidly fixture the stamped metal part. Stamped metal parts may flex or droop under gravity, and the direction and degree of flex can change depending on the direction of gravity relative to the part. Rigidly fixturing the part ensures the part maintains a consistent, rigid shape throughout the process to generate a complete reference cloud.

The above-noted solution may be used not only for part pose determination but could also be used to assist robot path planning. Since the solution captures large clouds representing the full field of view of the sensor or sensors mounted to the end-of-arm tool of the robot, the clouds will typically represent not only the parts in the rack, but also the interior surface of the rack itself. Although the rack is ignored during part pose measurement, the portion of the cloud representing the rack interior could be provided to the robot to assist in planning a motion path that does not lead the robot to collide with the rack walls.

Figure 10:
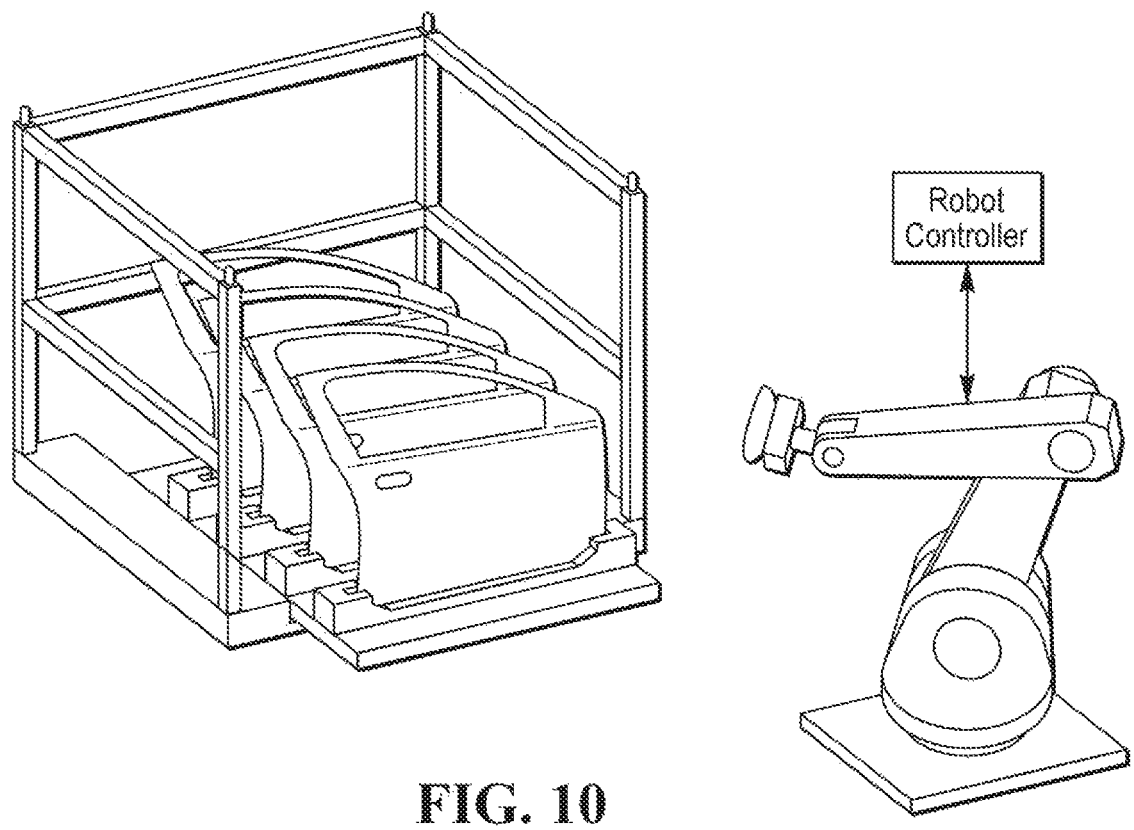
FIG. 10 is a schematic perspective view of a conventional storage cassette full of automotive parts such as doors and a robot to remove the parts one at a time from the cassette after cassette indexing.
Figure 11:
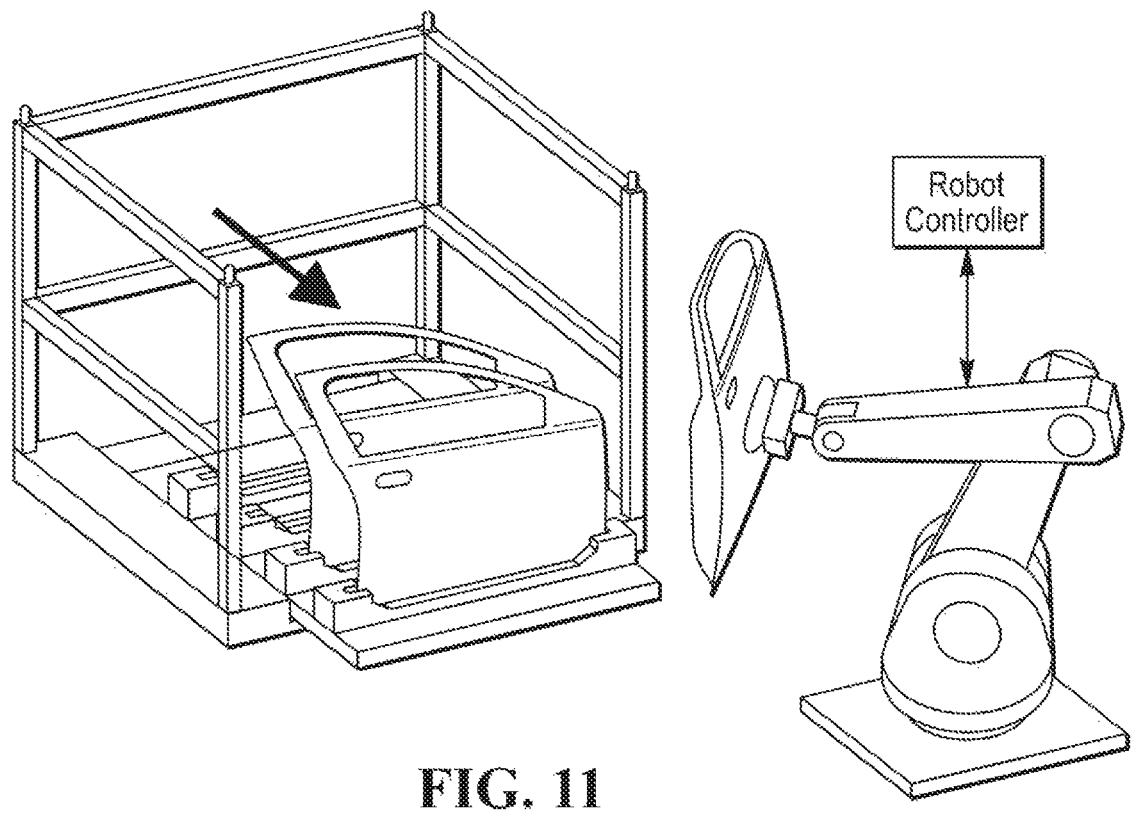
FIG. 11 is a view similar to the view of FIG. 10 but with only two parts remaining in the cassette and with the robot holding one of the parts.
Figure 12:
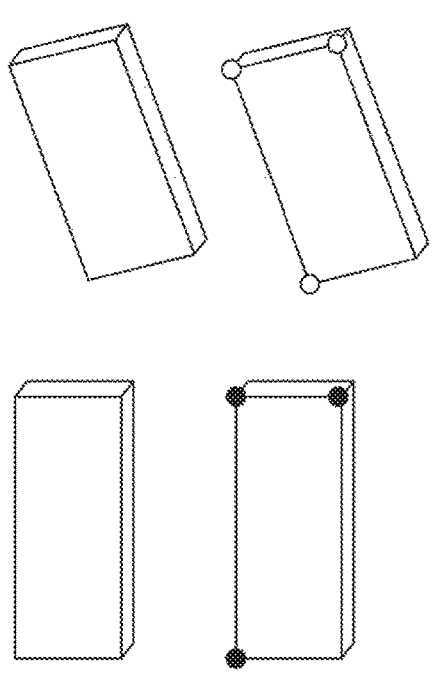
FIG. 12 illustrates in the top two images a cuboid part in two different poses in 3D space; the bottom two images show points in 3D space corresponding to optically distinct corners of the part, the dark filed circles represent points on the part in the reference pose, and the empty circles represent points on the part in a sample pose.
Figure 13:
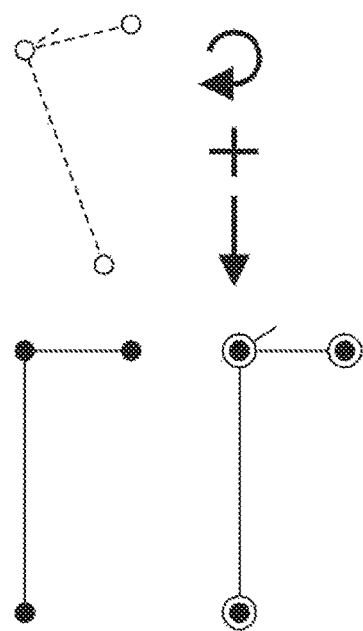
FIG. 13 is a schematic view related to FIG. 12; if the optically distinct corner points are identified with no measurement error, and if the part remains rigid, then a rigid transform will precisely map points on a part in a sample pose onto the points on the part in the reference pose; the concentric circles indicate a theoretical perfect mapping after transforming sample points to reference points.
Figure 14:
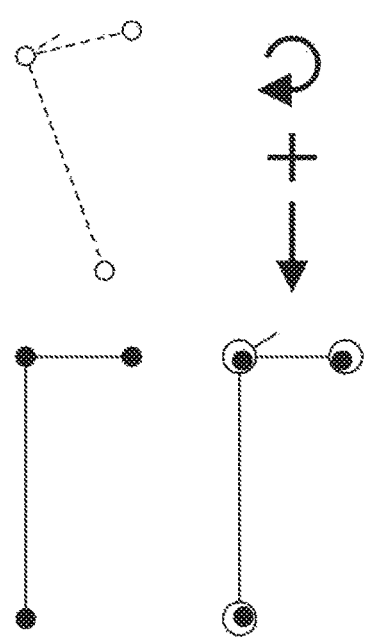
FIG. 14 is related to FIG. 13; real-world measurements have errors; for calculation of the rigid transform from sample points to reference points, a best-fit transform minimizes differences; in the dashed figure representing the sample part, the points are found slightly out of position.
Figure 15:
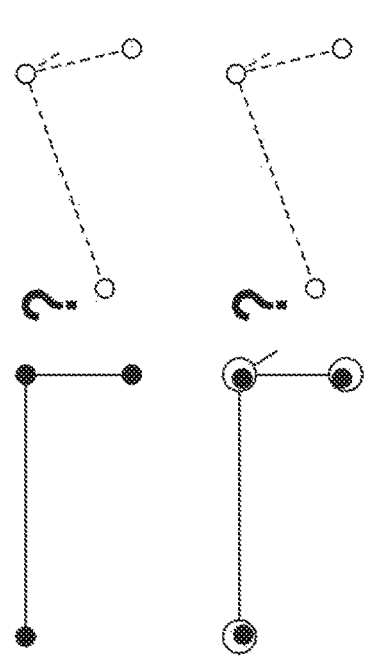
FIG. 15 is related to FIGS. 13 and 14; a best-fit rigid transform alone is insufficient to determine if the point-to-point relationships vary because of measurement error or because of slight differences in the as-built dimensions of the part; in the example of FIG. 15, the bottom dashed figure is slightly larger than the top dashed figure.
Figure 16:
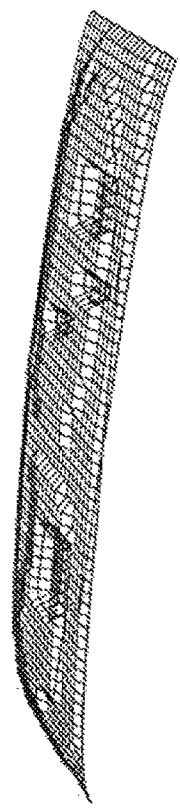
FIG. 16 is top schematic view of a substantially flat part with optically distinct features.
Figure 17:
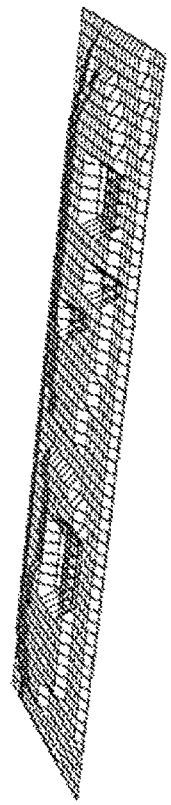
FIG. 17 is a top schematic view of a flat part of FIG. 16 with optically distinct features, the part drooping due to gravity.
Figure 18:
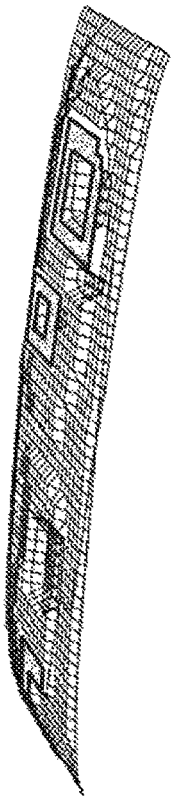
FIG. 18 is a top schematic view of a flat part with three optically distinct features identified as L-shaped and two rectangles, the geometric centers of these features are points in 3D space that may be used to estimate the pose of the part.
Figure 19:
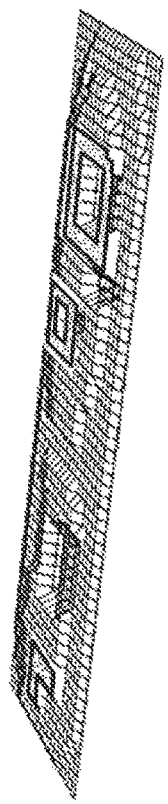
FIG. 19 is a top schematic view of the flat part of FIG. 18 with three optically distinct features on the part that droop due to gravity; a best-fit rigid transform from the three points on the drooped part to the three points on a nominally flat part will introduce translations or rotations that misrepresent the pose.
Figure 20:
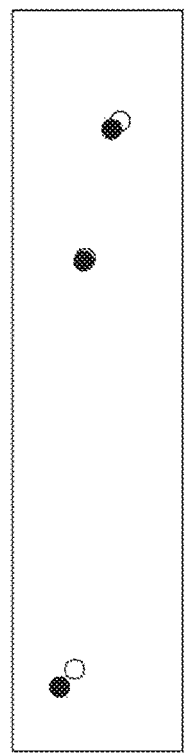
FIG. 20 is a top plan view of a flat part wherein the circles represent the geometric centers of optically distinct features on the flat part and on a part that droops due to gravity; the dark filled circles represent the points on the flat part, and the empty circles represent the corresponding points on the drooped part; a best-fit rigid transform from the three points on the drooped part to the three points on a nominally flat reference part will introduce inaccuracy of translations and rotations.

Referring now to FIGS. 10 and 11, the prior discussion relating to racks is applicable to the storage cassettes of FIGS. 10 and 11. At least one embodiment of the present invention provides robust measurement of part pose in the presence of bright ambient lighting and can function in complete absence of ambient light. Hybrid 2D/3D sensors determine depth using near-infrared light outside the visible spectrum, so ambient changes in visible light do not affect the system.

The solution can determine pose of arbitrarily large translations and rotations, including rotations up to 360 degrees about each axis. If the solution is configured to provide measurements within a limited range of poses representing correct fixturing of the part for robot pick, then the system will yield a fault condition for poses outside this range. However, the solution could also be configured to report poses for an arbitrarily large range, and thus report the pose of a part that is improperly fixtured.

Figure 22:
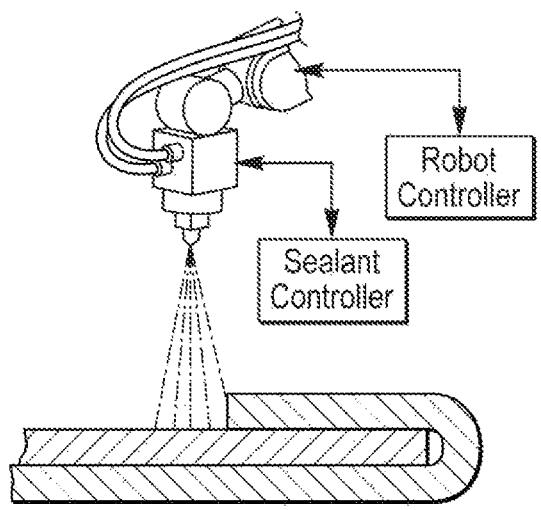
FIG. 22 is a side view, partially broken away and in cross-section, of a robot dispensing/spraying sealant on a hem; nozzle orientation is perpendicular to the surface as desired; the center axis of the nozzle lines up with the hem, and the sealant bead is centered on the hem.
Figure 23:
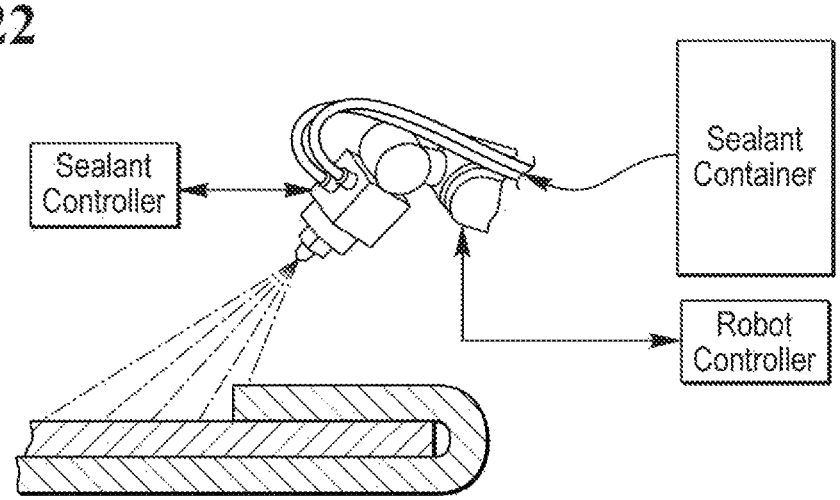
FIG. 23 is a view similar to the view of FIG. 22 of a robot spraying/dispensing sealant on a hem; nozzle orientation is angled, and the oblique angle increases the width of the sealant bead; even if the center axis of the nozzle aligns with the hem, the bead on the near side of the center axis will be narrower than the bead on the far side of the center axis.

Referring now to FIG. 22, the prior discussions relating to racks and cassettes are applicable to the hem flange of FIG. 22. At least one embodiment of the present invention comprises one or two robot-mounted sensors. For most applications within automotive assembly plants a cloud of 3D voxels representing a closure having a hem such as a hood or a door can be captured at once, obviating the need to move the robot so that sensors can capture additional data. But for much larger objects such as vehicle bodies, airplane wings, or airplane fuselages, the robot could move to multiple locations so that the same one or two robot-mounted sensors could capture multiple clouds and build up a combined cloud spanning a surface too large to be captured at once.

The present solution captures enough data to determine the pose of the closure at once, and does not require the sensor to be moved to multiple locations relative to the closure, an advantage over older solutions since reducing cycle time adds value.

Manufacturers improve productivity by reducing cycle time. Reducing the time a robot needs to spray or dispense sealant on a door hem incrementally reduces the overall time required to produce a vehicle. If a machine vision system can reduce the cycle time required to guide a robot, then the machine vision system adds value for the manufacturer.

Since accuracy requirement for pose measurement of hem flanges are typically stringent, the present solution can employ an optional pose measurement refinement using color or grayscale information. The clouds of 3D voxels include color or grayscale information for each voxel, permitting a secondary check of pose measurement.

The clouds provided by hybrid 2D/3D sensors for each voxel has information about x,y,z coordinates in 3D spaces as well as color or grayscale information. Large clouds provide not only a lot of depth data, but a lot of color or grayscale data as well.

Initial pose measurement is performed using 3D voxels, given that 3D pose inferred from the relative positions of edges can be inaccurate in measurement of orientation, but color or grayscale information is suitable for refining a pose measurement.

Referring again to FIG. 2, the prior discussions relating to racks, cassettes and hem flanges are applicable. In at least one embodiment of the invention, adding sensors to the solution merely increases the cloud size, and does not require subassembly-specific ad hoc parameterization. As a result, the present solution is well suited to measuring large objects. This solution can use an arbitrary number of sensors to measure objects of different sizes, including objects the size of automotive vehicle bodies and even much larger objects such as airplane fuselages and wings.

The solution includes a 3D display that can be used to identify whether a single subassembly is shifted out of place. If the aligned cloud closely matches the reference cloud in all locations except in the location of one subassembly, then that subassembly can be quickly identified as being out of place with respect to the other subassemblies in the vehicle body.

The solution can measure featureless surfaces. The ability to measure featureless surfaces permits the solution to measure vehicle subassemblies and vehicle bodies that might otherwise prove difficult for other pose measurement system, but also allows sensors to be positioned in a variety of locations.

Figure 24:
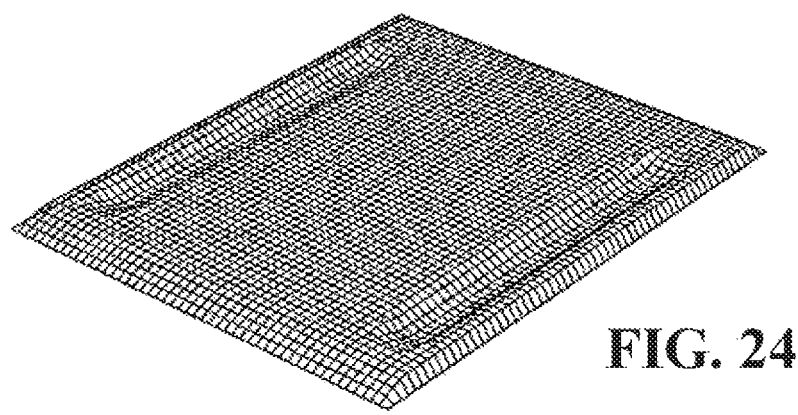
FIG. 24 is a top perspective schematic view of a mesh representation of a vehicle roof with two roof ditches.

Referring now to FIG. 24, the prior discussions relating to racks, cassettes, hem flanges and vehicle bodies are applicable. At least one embodiment of the present invention can measure "featureless" roof ditches. Whereas a feature-based machine vision system will fail or yield in accurate measurements when there are too few features, or if features are indistinct, the present solution uses entire clouds of voxels.

The solution has advantages over feature-based machine vision systems even when optically distinguishable features are present. The same sensors can be used to measure the pose of roof ditches for an arbitrary number of models. No ad hoc parameterization is required to train the system on each model.

The solution includes the 3D display of FIG. 2 that can be used to compare the position of a left roof panel and its roof ditch to the position of the right roof panel and its roof ditch. Since the solution captures clouds of voxels representing the roof panels and roof ditches, the pose of the aligned cloud can be compared visually to the pose of the reference cloud. The clouds will typically represent the entire roof, or a large portion thereof, ensuring that when a geometric comparison is made, no portion of the roof is missing from the data in consideration.

Embodiments of the invention can take the form of an entirely hardware embodiment, an entirely software embodiment or an embodiment containing both hardware and software elements. In a preferred embodiment, the invention including control logic is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A machine vision-based method of measuring 3D pose of a part or subassembly of parts having an unknown pose, the method comprising:
   providing a reference cloud of 3D voxels which represent a reference surface of a reference part or a subassembly having a known reference pose including a known orientation;
   moving at least one 2D/3D hybrid sensor relative to the part or subassembly of parts to acquire a sample cloud of 3D voxels which represent a corresponding surface of a sample part or a subassembly of the same type as the reference part or subassembly and having an actual pose including an actual orientation different from the known orientation of the reference pose; and
   processing the voxels of the sample and reference clouds utilizing a matching algorithm to determine the actual pose including the orientation of the sample part or subassembly, wherein the matching algorithm determines a best fit between the sample and the reference clouds and the matching algorithm calculates a reference-to-sample transform between the reference and actual poses.

2. The method as claimed in claim 1, wherein the step of providing is at least partially performed by the at least one sensor.

3. The method as claimed in claim 1, wherein the part or subassembly is located and supported in a fixture.

4. The method as claimed in claim 1, further comprising calculating an aligned cloud of 3D voxels which represents the best fit of the reference and sample clouds and displaying a 3D graphic of the aligned cloud and the reference cloud on a 3D display.

5. The method as claimed in claim 1, wherein each sensor projects a known pattern of radiation to illuminate the part or subassembly with illumination.

6. The method as claimed in claim 1, wherein the clouds of 3D voxels include color or grayscale information for each voxel to enhance the pose measurement.

7. The method as claimed in claim 1, wherein the reference cloud represents substantially the entire reference surface.

8. The method as claimed in claim 3, wherein the fixture comprises a part or a subassembly of parts.

9. The method as claimed in claim 3, wherein the fixture comprises a moveable carrier.

10. The method as claimed in claim 4, wherein the 3D display is used to identify whether a subassembly of parts is out of place with respect to other subassemblies of a body of subassemblies.

11. The method as claimed in claim 4, wherein the 3D display is used to visually compare pose of the aligned cloud with the pose of the reference cloud.

12. The method as claimed in claim 5, wherein the illumination is concentrated in the pattern outside of the spectrum of visible radiation.

13. The method as claimed in claim 7, wherein the step of providing includes the steps of providing a CAD model of the part or subassembly and converting the CAD model into the reference cloud.

14. The method as claimed in claim 7, wherein the step of providing includes the steps of rigidly fixturing an as-built part and capturing a plurality of reference clouds of 3D voxels from multiple viewpoints using a plurality of 3D sensors.

15. The method as claimed in claim 9, wherein the carrier is a storage rack for locating and supporting a plurality of individually fixtured parts or subassemblies of the same type.

16. The method as claimed in claim 9, wherein the carrier is a storage cassette for locating and supporting a plurality of individually fixtured parts or subassemblies of the same type.

17. The method as claimed in claim 9, wherein the carrier is a car carrier for locating and supporting a plurality of individually fixtured vehicle bodies of the same type.

18. A machine vision-based system for measuring 3D pose of a part or subassembly of parts having an unknown pose, the system comprising:
   at least one 2D/3D hybrid sensor;
   a memory configured to store a reference cloud of 3D voxels which represent a reference surface of a reference part or subassembly having a known reference pose including a known orientation;
   a controller configured to cause the at least one 2D/3D hybrid sensor to move to acquire a sample cloud of 3D voxels which represent a corresponding surface of a sample part or subassembly of the same type as the reference part or subassembly and having an actual pose including an actual orientation different from the known orientation of the reference pose; and
   at least one processor to process the voxels of the sample and reference clouds utilizing a matching algorithm to determine the actual pose including the orientation of the sample part or subassembly, wherein the matching algorithm determines a best fit between the sample and the reference clouds and the matching algorithm is configured to calculate a reference-to-sample transform between the reference pose and the actual pose.

19. The system as claimed in claim 18, wherein the at least one sensor provides the reference cloud.

20. The system as claimed in claim 18, wherein the part or subassembly is located and supported in a fixture.

21. The system as claimed in claim 18, wherein the at least one processor calculates an aligned cloud of 3D voxels which represents the best fit of the reference and sample clouds and wherein the system further comprises a 3D display to display a 3D graphic of the aligned cloud and the reference cloud.

22. The system as claimed in claim 18, wherein each sensor projects a known pattern of radiation to illuminate the part or subassembly with illumination.

23. The system as claimed in claim 18, wherein the clouds of 3D voxels include color or grayscale information for each voxel to enhance the pose measurement.

24. The system as claimed in claim 18, wherein the reference cloud represents substantially the entire reference surface.

25. The system as claimed in claim 20, wherein the fixture comprises a part or a subassembly of parts.

26. The system as claimed in claim 20, wherein the fixture comprises a moveable carrier.

27. The system as claimed in claim 21, wherein the 3D display is used to identify whether a subassembly of parts is out of place with respect to other subassemblies of a body of subassemblies.

28. The system as claimed in claim 21, wherein the 3D display is used to visually compare pose of the aligned cloud with the pose of the reference cloud.

29. The system as claimed in claim 22, wherein the illumination is concentrated in the pattern outside of the spectrum of visible radiation.

30. The system as claimed in claim 24, further comprising a CAD model of the part or subassembly and wherein the control logic converts the CAD model into the reference cloud.

31. The system as claimed in claim 24, further comprising a fixture to rigidly fixture an as-built part and a plurality of sensors to capture a plurality of reference clouds of 3D voxels from multiple viewpoints.

32. The system as claimed in claim 26, wherein the carrier is a storage rack for locating and supporting a plurality of individually fixtured parts or subassemblies of the same type.

33. The system as claimed in claim 26, wherein the carrier is a storage cassette for locating and supporting a plurality of individually fixtured parts or subassemblies of the same type.

34. The system as claimed in claim 26, wherein the carrier is a car carrier for locating and supporting a plurality of individually fixtured vehicle bodies of the same type.

* * * * *